United States Patent [19]

Takamine

[11] Patent Number: 5,577,009
[45] Date of Patent: Nov. 19, 1996

[54] TRACKING CONTROL SYSTEM FOR GENERATING A VARIABLE STILL JUMP SIGNAL

[75] Inventor: Kouichi Takamine, Hirakata, Japan

[73] Assignee: Matsushita Electric Industrial Co., Ltd., Osaka, Japan

[21] Appl. No.: 376,741

[22] Filed: Jan. 23, 1995

[30] Foreign Application Priority Data

Jan. 25, 1994 [JP] Japan .................................. 6-006086
Jun. 28, 1994 [JP] Japan .................................. 6-145890

[51] Int. Cl.$^6$ .................................................. G11B 7/085
[52] U.S. Cl. ..................... 369/32; 369/44.28; 369/44.29; 369/44.34; 369/54
[58] Field of Search ................................... 369/32, 44.25, 369/44.28, 44.29, 44.34, 44.35, 54, 58

[56] References Cited

FOREIGN PATENT DOCUMENTS

| 4960702 | 6/1974 | Japan . |
| 62-128025 | 6/1987 | Japan . |
| 383272 | 4/1991 | Japan . |
| 460974 | 2/1992 | Japan . |
| 5307845 | 11/1993 | Japan . |

*Primary Examiner*—W. R. Young
*Attorney, Agent, or Firm*—Price, Gess & Ubell

[57] ABSTRACT

The present invention relates to a tracking control apparatus wherein an LM driving value for just before a still jump held by a S/H circuit 23 is inputted into the CPU 43 via a low-pass filter 29 and an A/D convertor 30. In this way the magnitude of the still jump signal consisting of a jump pulse and a brake pulse can be set at a value which takes into account disturbances occurring at that time due to the load and suchlike in the flexi-substrate and eccentricities in the track, and the amplitude and/or the pulse width of every pulse can be controlled based on the LM driving value just before the still jump. In the same way, when executing a track seeking operation, by inputting the outputs of the velocity detector 35 and the seeking control circuit 44 into the brake pulse generation circuit 41 via the brake pulse control circuit 42, then the amplitude and/or the pulse width of the brake pulse can be controlled so as take a value which takes into account disturbances occurring at that time due to the load and suchlike in the flexi-substrate and eccentricities in the track, based on the movement velocity of the light spot and LM driving value at that time.

27 Claims, 15 Drawing Sheets

Fig. 2 (Related Art)

TE SIGNAL

TWO STATE
TE SIGNAL

S/H SIGNAL

STILL JUMP
SIGNAL

Fig. 4 (Related Art)
Fig. 4A
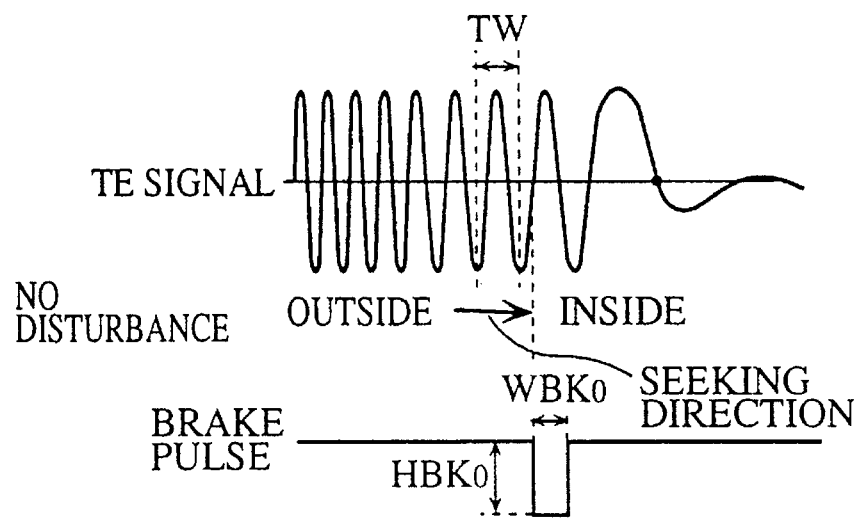
Fig. 4B
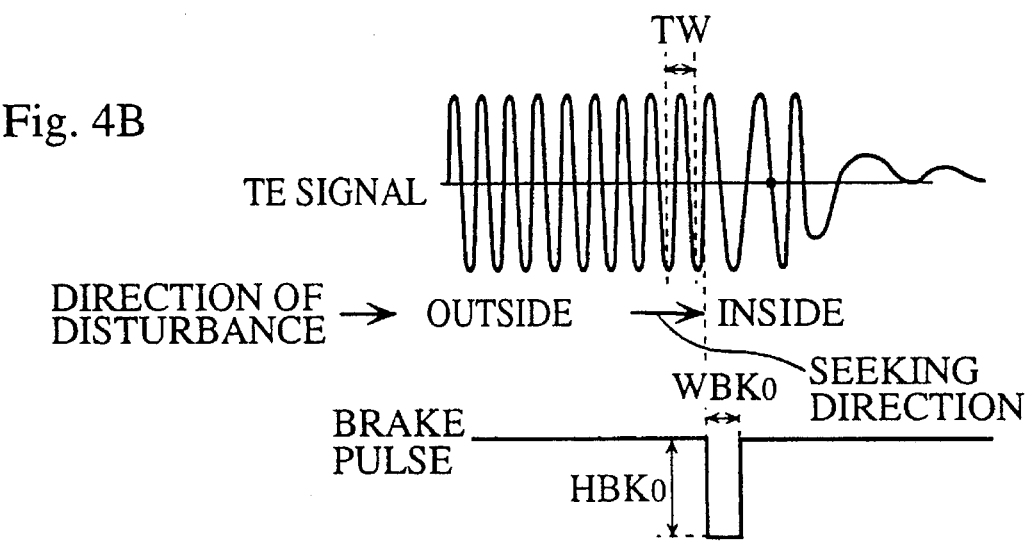
Fig. 4C
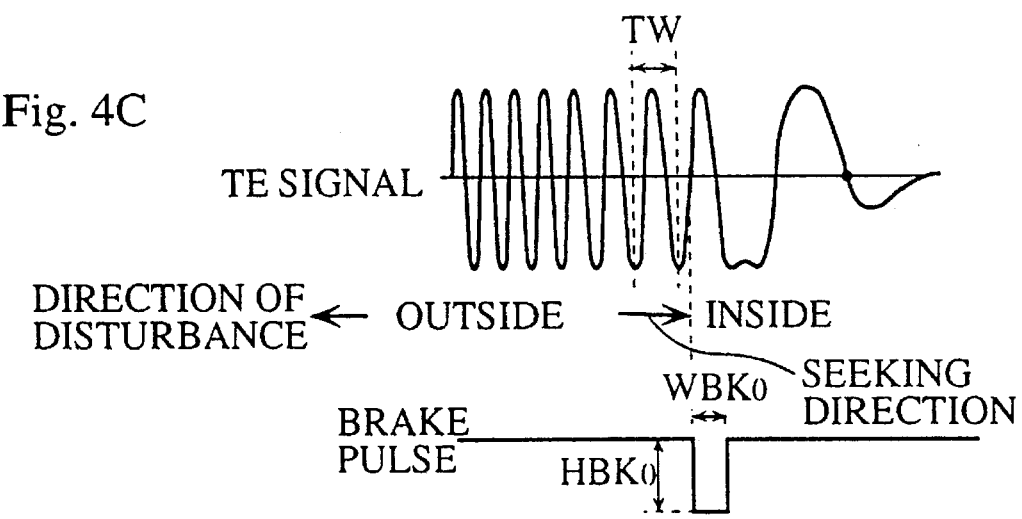

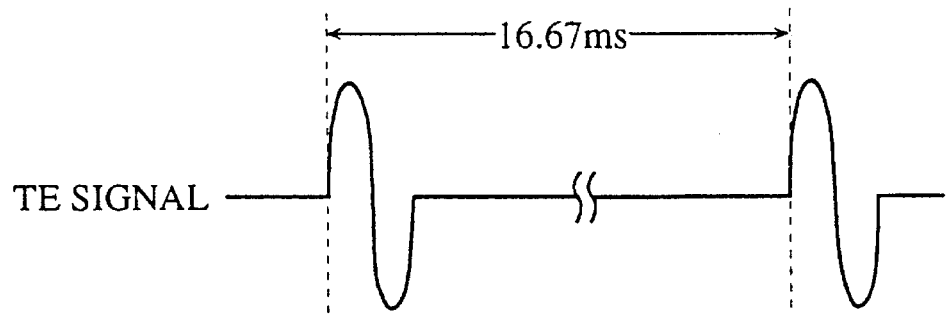
Fig. 6A  TE SIGNAL
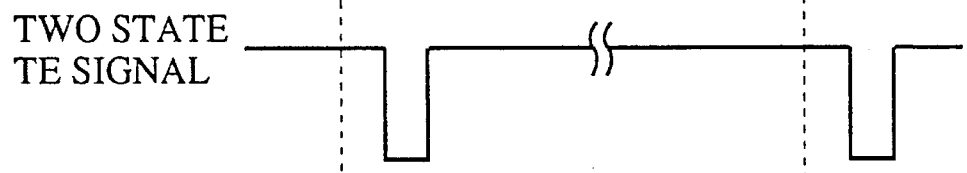
Fig. 6B  TWO STATE TE SIGNAL
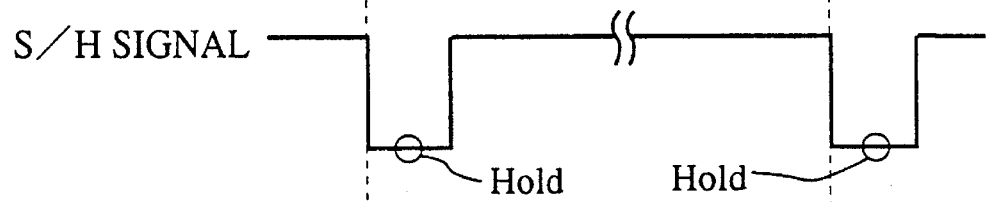
Fig. 6C  S/H SIGNAL
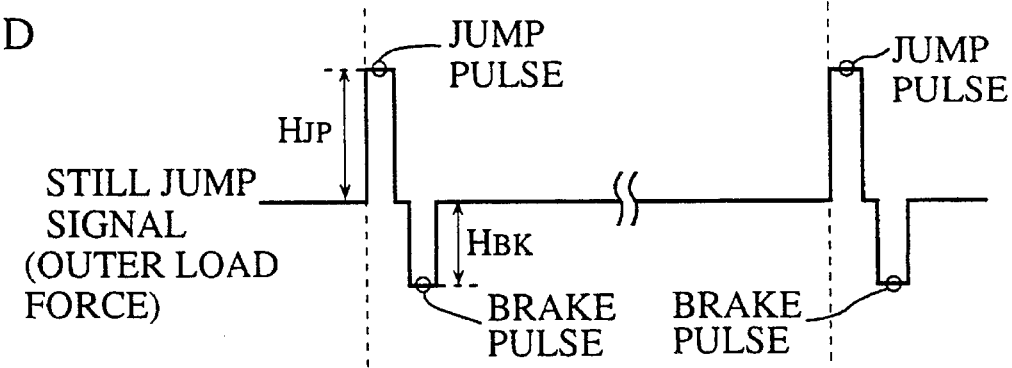
Fig. 6D  STILL JUMP SIGNAL (OUTER LOAD FORCE)
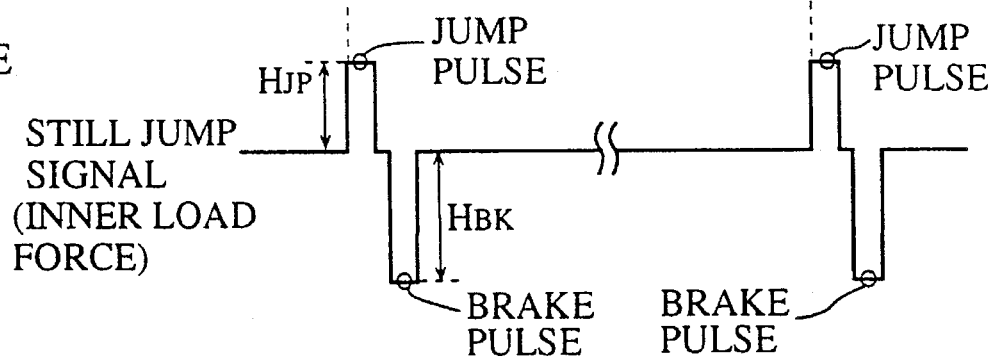
Fig. 6E  STILL JUMP SIGNAL (INNER LOAD FORCE)

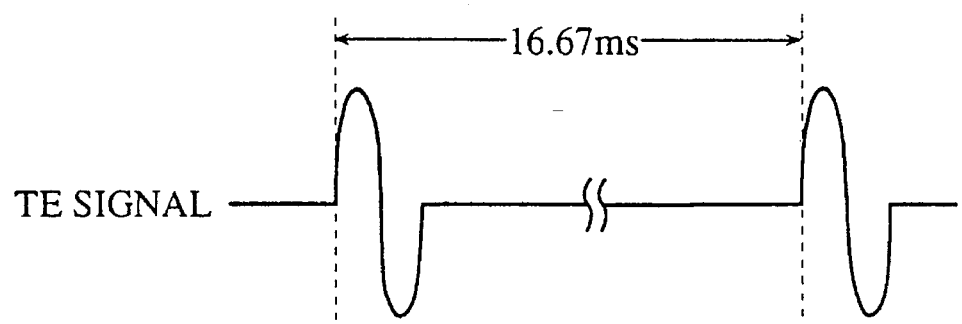
Fig. 7A   TE SIGNAL
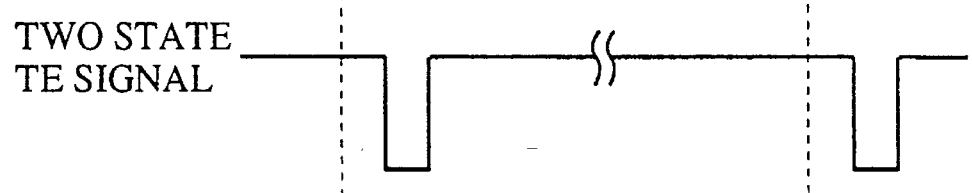
Fig. 7B   TWO STATE TE SIGNAL
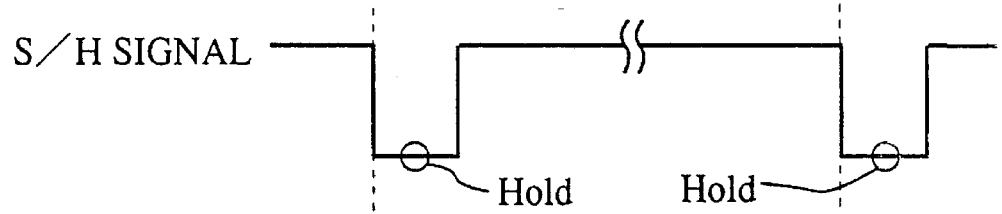
Fig. 7C   S/H SIGNAL
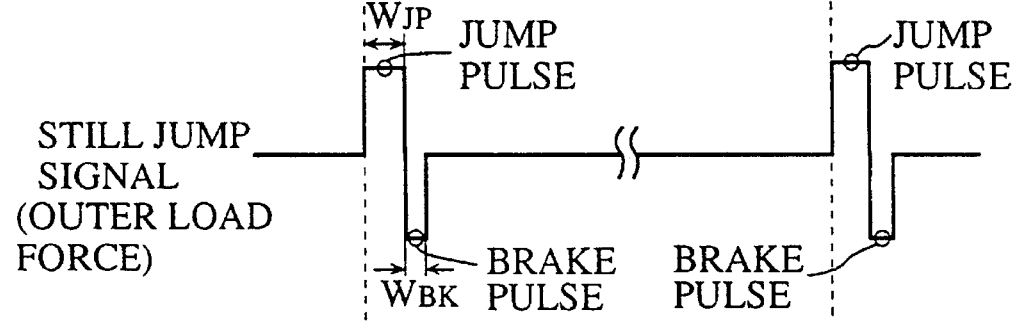
Fig. 7D   STILL JUMP SIGNAL (OUTER LOAD FORCE)
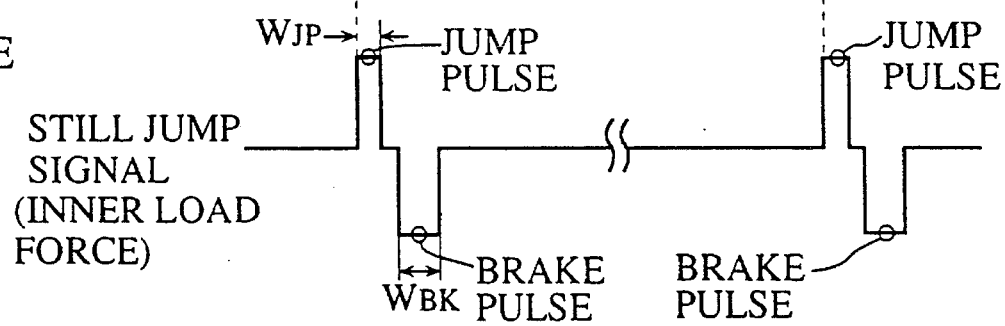
Fig. 7E   STILL JUMP SIGNAL (INNER LOAD FORCE)

TRACKING CONTROL SYSTEM FOR GENERATING A VARIABLE STILL JUMP SIGNAL

BACKGROUND OF THE INVENTION

1. Field of the Invention

The present invention relates to a tracking control system for an optical recording and reproduction apparatus which can record optical signals on and reproduce recorded signals from a recording medium by means of a light source such as a laser.

2. Description of the Related Art

In recent years, in order to improve optical recording and reproduction apparatuses (optical disc apparatuses), and achieve a reduction in size of the optical disc apparatus as well as high speed track seeking, separated optical systems using an optical pick-up have been used to achieve a reduction in the size of the movable part of the apparatus.

Before the introduction of separated optical systems, the major part of the optical system including the light source, the light detection unit and the objective lens etc. would all be installed as the movable part. For separated optical systems, this kind of optical system is arranged so as to separated into a fixed part and a movable part. For such a separated optical system, the utilization of a galvano-mirror and a linear motor (hereafter referred to as the "LM") as a tracking actuator for controlling the tracking of a light spot so that it follows a track on an optical disc (hereafter simply referred to as the "disc"), is already a known technique. Such a galvano-mirror is installed in the fixed part and is used as a fine actuator which deflects the light spot to maintain a precise position in the tracking direction. Such an LM is used as a crude actuator which moves the light spot in the radial direction over a wide area of the disc by moving the movable part, including the objective lens and suchlike, in the radial direction of the disc.

FIG. 1 is a block diagram showing the construction of the part of a conventional tracking control system which relates to a still jump operation. In FIG. 1, a side view of the optical system between the light source 1 and the photodetector 12, including the galvano-mirror 27 and the LM 28, is shown. To the left of the side view of the photodetector 12 is a figure showing the photodetection surface from the angle at which the light beam is incident on the surface.

As shown in FIG. 1, a tracking control system constructed according to the related art is comprised of a light source 1, a collimating lens 2, a beam splitter 3, a mirror 4, an objective lens 5, a spindle motor 6, a disc 7, a light beam 8, a convex lens 9, a cylindrical polarized beam splitter 10 (hereafter, the cylindrical PBS), a photodetector 12, a differential amplifier 13, another differential amplifier 14, a summing amplifier 16, a variable amplifier 17, a divider 18, a two state circuit 19, a phase compensation circuit 20, an equivalency filter 21, a phase compensation circuit 22, a sample and hold circuit 23 (hereafter, the S/H circuit), a summing amplifier 24, a galvano-mirror driving circuit 25 (hereafter, the GM driving circuit), an LM driving circuit 26, a galvano-mirror 27, an LM 28, a D/A convertor 31, a signal processing circuit 32, an A/D convertor 33 and a CPU 34.

The light source 1 consists of a semiconductor laser or suchlike and emits a coherent light beam 8.

The collimating lens 2 collimates the dispersed light beam 8 emitted by the semiconductor laser into a beam of parallel rays.

The beam splitter 3 allows the light beam 8 from the light source 1 to pass through it and reflects the light beam 8 reflected back by the disc 7 so as to be incident on the photodetector 12.

The mirror 4 reflects the light beam 8 from the light source 1 so as to pass through the objective lens 5.

The objective lens 5 focuses the light beam 8 from the light source 1 reflected by the mirror 4 on the disc 7.

The spindle motor 6 rotates the disc 7 at an approximate speed of 3600 rpm. By means of the spindle motor 6 rotating the disc 7, the light spot is made to move in a circumferential direction over the disc 7.

The disc 7 is a storage medium constructed so that there is a spiral track on its surface which includes a number of pits, and stores digital data according to the existence or not of such pits. The existence or not of such pits is detected according to the amount of light in the light beam 8 reflected off the surface of the disc 7.

The convex lens 9 focuses the light beam 8 reflected back off the disc 7 on the photodetection surface of the photodetector 12.

The cylindrical PBS 10 splits the light beam 8 reflected back off the disc 7 into the light beam 11 and the light beam 15. The light beam 11 is used for tracking control which is described below, while the light beam 15 is used for focusing control and suchlike which is also described below.

The photodetector 12 converts the amount of light in the light beam 11 and the light beam 15 incident upon its photodetection surface into electrical signals. As can be seen from the drawing of photodetection surface in the optical system drawn to the left of the photodetector 12 in FIG. 1, the photodetection surface of the photodetector 12 is divided into 4 areas, with the focus control signal being generated from the light beam 15 in the top right area of the photodetection surface, and the tracking control signal being generated from the light beam 11 in the bottom left area of the photodetection surface. The area of the photodetection surface used to generate the tracking control signal is further divided into 2 areas, with the 2 detected amounts of light being converted into 2 electrical signals, output A and output B. The area of the photodetection surface used to generate the focus control signal is further divided into 4 areas, with the amount of light in pairs of diagonally opposite corners of the photodetection surface being converted into electrical signals.

The differential amplifier 13 finds any difference in the electrical signals generated according to the amount of light detected by the focus control area of the photodetector 12 and outputs it as a focus error signal.

The differential amplifier 14 finds any difference in the electrical signals, output A and output B, generated according to the amount of light detected by the tracking control area of the photodetector 12 and outputs it as a tracking error signal. The summing amplifier 16 sums the amount of light in output A and output B and outputs it as the total light amount signal.

The variable amplifier 17 is an amplifier with an adjustable gain, and has its gain adjusted so that the amplitude of the tracking error signal is approximately constant at the output point "a" of the variable amplifier 17.

The divider 18 divides the tracking error signal which is the output of the variable amplifier 17 by the total light amount signal which is the output of the summing amplifier 16. The light beam incident on the photodetector 12 is subject to changes in the amount of light when the optical disc apparatus is recording or erasing data on the disc 7, or changes in the reflectivity of the disc 7, and corresponding to such changes in the amount of light in the light beam, the amplitude of the total light amount signal is modified in the same way as the tracking error signal. Therefore, by dividing the tracking error signal by the total light amount signal, the divider 18 can keep roughly constant the amplitude of the tracking error signal which it outputs, even when there are changes in the amount of light incident on the photodetector 12.

The two state circuit 19 converts the tracking error signal inputted from the divider 18 into a two state signal.

The phase compensation circuit 20 compensates the phase of the tracking error signal inputted from the divider 18, and by ensuring that there is a phase margin at the gain crossover frequency of the tracking control system which controls the driving of the galvano-mirror 27 (or the tracking servo loop) prevents oscillation in the tracking control.

The equivalency filter 21 is a low-pass filter with roughly equal transfer function characteristics to the tracking fine actuator which rotates the galvano-mirror 27.

The phase compensation circuit 22 compensates the phase of the tracking error signal which has passed through the equivalency filter 21, and, by ensuring there is a phase margin at the gain crossover frequency of the driving control system which controls the driving of the LM 28 (or the traverse servo loop), prevents oscillation in the tracking control.

The S/H circuit 23 simply outputs the LM driving value from the phase compensation circuit 22 to the LM driving circuit 26 when in sample mode, while, when in hold mode, it stores the LM driving value from the phase compensation circuit 22 at the point at which hold mode is initiated and outputs this held value.

The summing amplifier 24 adds together the tracking error signal which is the output of the phase compensation circuit 20 and galvano-mirror driving value which is the output from the D/A convertor 31.

The GM driving circuit 25 generates the GM driving voltage based on the galvano-mirror driving value outputted from the summing amplifier 24, and applies the generated GM driving voltage to the galvano-mirror 27.

The LM driving circuit 26 generates the LM driving voltage based on the LM driving value outputted from the phase compensation circuit 22 via the S/H circuit 23, and applies the generated LM driving voltage across the LM 28.

The galvano-mirror 27 includes a mirror part and a mirror moving part, so that the mirror moving part rotates the mirror in accordance with the GM driving voltage applied by the GM driving circuit 25. The mirror part reflects the light beam from the light source 1 which has passed through the beam splitter 3 towards the mirror 4 and reflects the light beam reflected back from the disc 7 towards the beam splitter 3.

The LM 28 is installed in the moving part which also contains the mirror 4 and the objective lens 5 and is connected by a flexible substrate or suchlike (hereafter, the flexi-substrate) to the LM driving circuit 26. The LM 28 is driven by the driving voltage applied by the LM driving circuit 26, so that it moves the movable part so as to follow a guide-rail (not shown in the drawings) which is positioned above the disc 7 in a radial direction to it.

The D/A convertor 31 converts the galvano-mirror driving value from the CPU 34 into an analogue signal.

The signal processing circuit 32 adjusts the amplitude of the total light amount signal from the summing amplifier 16 so as to conform to amplitude of the input voltage of the A/D convertor 33.

The A/D convertor 33 digitizes the total light amount signal from the signal processing circuit 32.

The CPU 34 detects any tracking errors of the light spot from the tracking error signal inputted from the two state circuit 19. The CPU 34 also reads the information such as the address of the light spot on the track from the total light amount signal inputted from the A/D convertor 33, as well as generating the driving value for the galvano-mirror 27 and the S/H signal which switches the S/H circuit 23 to hold mode/sample mode, and, by controlling the above construction elements, has the tracking operation performed.

The following is an explanation of an example of a still jump operation executed by a tracking control system constructed under the related art.

As shown in FIG. 1, once the light beam 8 emitted by the light source 1 has been collimated by the collimating lens 2, then it passes through the beam splitter 3, and is reflected by the galvano-mirror 27 which serves as the tracking fine actuator. The light beam 8 reflected off the galvano-mirror 27 is then reflected by the mirror 4 in the movable part so that it is then focused by the objective lens 5 on the surface of the disc 7 which is rotated by the spindle motor 6. The light beam 8 reflected back off the disc 7 then passes back through the objective lens 5 and is reflected by the mirror 4, before being reflected by the galvano-mirror 27. The light beam 8 reflected by the galvano-mirror 27 is then reflected by the beam splitter 3 so as to pass through the convex lens 9. The light beam 8 which passes through the convex lens 9 is then split by the cylindrical PBS 10 into the light beam 11 and the light beam 15.

The divided light beam 11 is then inputted into the photodetector 12. Output A and output B from the photodetector 12 are then inputted into each of the input terminals of the differential amplifier 14. The differential amplifier 14 then outputs the tracking error signal by calculating the difference between the output A and output B. The tracking error signal from the differential amplifier 14 is then inputted into the variable amplifier 17. The variable amplifier 17 then adjusts the amplitude of the tracking error signal so that it is roughly constant. The output of the variable amplifier 17 is then inputted into one of the input terminals of the divider 18. The total light amount signal from the summing amplifier 16 is inputted into other input terminal of the divider 18. The divider 18 then divides the output signal from the variable amplifier 17 by the output signal from the summing amplifier 16, in doing so restraining any change in amplitude in the tracking error signal generated as a result of changes in the light amount in the light beam 11.

The detection of a tracking error for the light spot based on a tracking error signal obtained by the process described above is known as the "push-pull method" (disclosed, for example, in Japanese Laid-Open Patent Publication No.49-60702). Additionally, if the total light amount signal which is the output of the summing amplifier 16 is demodulated by the CPU 34 after it has been processed by the signal processing circuit 32 and digitized by the A/D convertor 33, then while it is in the state wherein tracking control is being executed, the CPU 34 can read the address or the data which is stored on the disc 7 from the demodulated total light amount signal.

(Focus Control)

The other light beam 15 split by the cylindrical PBS 10 is inputted into the focus control photodetection surface of the photodetector 12. The focus control system is not shown in the drawings, but obtains a focus error signal which shows a divergence from the fixed focused state of the light beam 8 on the disc 7, based on the output of the photodetector 12. Here, the detection of the focus error signal is executed according to an astigmatic method which is a known technique. The focus control system (not illustrated) executes a known technique of focus control by driving a focus actuator (not illustrated) based on the focus error signal, and in doing so ensures that the light beam 8 maintains a fixed focused state on the disc 7. Since the present invention does not directly relate to such a focus control system, detailed explanation thereof has not been made.

(Tracking Control)

The following is a brief explanation of the operation of the tracking control system constructed in the manner described above when tracking control is being performed. Tracking control is executed by using the galvano-mirror 27 which is the fine actuator in response to high speed tracking errors and by using the LM 28 which is the crude actuator in response to low speed tracking errors. The LM 28 is also driven when a seeking operation is performed, which requires moving across a wide area or, indeed, across the whole area of the disc 7.

By means of the process carried out by the divider 18, with the amplitude of the tracking error signal being kept roughly constant in spite of changes in the amount of light when recording or erasing part of the disc 7, or changes in the reflectivity of the disc 7, the tracking error signal is inputted into the GM driving circuit 25 via the phase compensation circuit 20 and the summing amplifier 24. While tracking control is being performed, then the galvano-mirror 27 is rotated by means of the driving voltage generated by the GM driving circuit 25 in response to the tracking error signal. This rotation of the galvano-mirror 27 moves the light spot on the disc 7 in the radial direction of the disc 7 (that is to say, the direction crossing the tracks, hereafter the tracking direction) so that it is always positioned in the center of the track. At such a time the mirror part of the galvano-mirror 27 is controlled so as to rotate in both directions from an angle at which it is disposed about a central rotational axis.

The movable part, in which the mirror 4 and the objective lens 5 are installed, is capable of moving from the inside to the outside of the disc 7 in the tracking direction. During tracking control, the output from the phase compensation circuit 20 is applied to the LM 28 via the equivalency filter 21, the phase compensation circuit 22 for the LM control system, the S/H circuit 23 and the LM driving circuit 26. By passing through the equivalency filter 21, then the tracking error signal is inputted into the LM driving circuit 26 once the part of the tracking error signal which is equivalent to the gain of the galvano-mirror 27 has been removed. By doing so, the galvano-mirror 27 and the LM 28 in this tracking control system compensate each other and tracking control which ensures that the light spot is always positioned in the center of a track is executed.

When one revolution of the disc is made with the light spot in a state of following the track, then the light spot will become positioned so as to be on the neighboring outer track, this being due to the spiral construction of the track on the surface of the disc 7.

(Still Jump)

For the reason given above, it can be seen that when the CPU 34 in executing tracking control seeks to have the light spot positioned on the same track, then, for each complete rotation of the disc, it will have the light spot jump track back to the starting track by having the galvano-mirror 27 rotated.

When tracking control is being performed so that the light spot follows the track on the disc 7 as it rotates, then the total light amount signal from the signal processing circuit 32 is inputted into the CPU 34 via the A/D convertor 33. In this way, the CPU 34 can confirm the present address of the light spot on the disc 7. When the light spot has jumped track, then the CPU 34 controls the galvano-mirror 27 so as to return the light spot to the starting position of the original track.

The CPU 34 generates a still jump signal when seeking to execute a still jump operation. A still jump signal includes a jump pulse for having the light spot jump towards the inside of the disc 7 and a brake pulse for stopping the light spot from going too far towards the inside. The jump pulse shows the GM driving voltage value for having the light spot jump tracks. The data in the track jump signal from the CPU 34 is converted into an analogue signal by the D/A convertor 31 before being inputted into one of the terminals of the summing amplifier 24, while the tracking error signal is inputted into the other input terminal, having passed through the divider 18 and the phase compensation circuit 20.

The following is an explanation of the operational timing of each of the construction elements during a still jump operation, with reference to the drawings FIGS. 2A through 2D.

FIG. 2A is a wave diagram showing the operation timing of the tracking error (TE) signal when there is a still jump, FIG. 2B a wave diagram showing the operation timing of the two state TE signal when there is a still jump, FIG. 2C a wave diagram showing the operation timing of the S/H signal when there is a still jump and FIG. 2D a wave diagram showing the operation timing of the still jump signal when there is a still jump.

When the light spot comes to the end position of the object track, the CPU 34 outputs the still jump signal shown in FIG. 2D to the D/A convertor 31, and the still jump is commenced by the galvano-mirror 27. As shown in FIG. 2D the still jump signal generated by the CPU 34 is composed of a jump pulse and a brake pulse of a constant width and a constant amplitude.

At the same time as the jump pulse of the still jump signal is being added to the tracking control loop for the galvano-mirror 27 (hereafter the GM control loop) via the D/A convertor 31, the LM driving value in the tracking control loop for the LM 28 (hereafter the LM control loop) is held by the S/H circuit 23. The LM 28 is driven by the LM driving value (a constant value) held by the S/H circuit 23. Mode control of the S/H circuit 23 is executed by the CPU 34 using the S/H signal shown in FIG. 2C. For this example, the S/H circuit 23 assumes sample mode when it receives a high level S/H signal, while it assumes hold mode when it receives a low level S/H signal. Under hold mode, for example at the point when the S/H signal falls to a low level, then the S/H circuit 23 holds the inputted LM driving value and outputs this held LM driving value.

In this state, the galvano-mirror 27 is driven by the jump pulse shown in FIG. 2D so as to rotate and hence guide the light spot towards the inside of the disc 7. Once the jump pulse has been supplied to the GM control loop and the light spot has traversed one track, then, as shown in FIG. 2A, the voltage of the TE signal becomes a standard voltage when the light spot passes the center of the track. When the CPU 34 judges from the TE signal that the light spot has traversed the groove between the object track and the neighboring track on the inner side at the point corresponding to the end of the object track before the still jump was made, then it supplies the brake pulse shown in FIG. 2D to the GM control loop, and reduces the velocity of the galvano-mirror 27. In doing so, the CPU 34 supplies the brake pulse to the galvano-mirror 27 at the point when the value of the voltage in the tracking error signal becomes the standard voltage and hence ends the still jump with the light spot at the start of the intended track.

As shown in FIG. 2D, the brake pulse and the jump pulse are generated so that a suitable still jump operation is possible when there are no effects due to eccentricities in the track from the center of rotation nor any effects due to the load force and suchlike of the flexi-substrate. Therefore the size of both the jump pulse and the brake pulse are constant.

After the still jump has been completed, the CPU 34 switches the S/H circuit 23 back to sample mode by means of the S/H signal. In doing so, tracking control using the galvano-mirror 27 and the LM 28 is commenced. In this way, a still jump is performed once for each single rotation of the disc 7, and the light spot is controlled so that it is always kept in the center of intended track on the disc 7.

(Construction Handling the Seeking Operation)

FIG. 3 is a block diagram showing the construction of the part of tracking control system which handles the track seeking operation under the related art.

In addition to the optical system constructed between the light source 1 and the photodetector 12, the tracking control system includes a differential amplifier 13, another differential amplifier 14, a light beam 15, a summing amplifier 16, a variable amplifier 17, a divider 18, a two state circuit 19, a phase compensation circuit 20, an equivalency filter 21, a phase compensation circuit 22, a GM driving circuit 25, an LM driving circuit 26, a galvano-mirror 27, an LM 28, a D/A convertor 31, a signal processing circuit 32, an A/D convertor 33, a velocity detector 35, a seeking control circuit 36, a switching circuit 37, a signal selection circuit 38, another signal selection circuit 39, a D/A convertor 40, and a brake pulse generation circuit 41.

The construction elements which are the same as those shown in FIG. 1 have been given the same reference numerals here, and their explanation has been omitted.

The velocity detector 35 measures the time taken for the light spot to traverse two tracks based on the two state TE signal inputted from the two state circuit 19 and detects the velocity of the moving part during a seeking operation.

The seeking control circuit 36 switches on the tracking control operation and the seeking operation by switching on the switching circuit 37, signal selection circuit 38 and the signal selection circuit 39, as well as retrieving the address on the track where the light spot is positioned from the total light amount signal inputted via the signal processing circuit 32 and the A/D convertor 33, and calculating the number of tracks from the present position of the light spot to the intended track. Additionally, the seeking control circuit 36 gives an indication to the brake pulse generation circuit 41 to output a brake pulse when the light spot reaches a point 1.5 tracks before the intended track.

The switching circuit 37 is turned ON/OFF by the control signal from the seeking control circuit 36, which connects/disconnects the galvano-mirror control loop. When the switching circuit 37 is turned OFF, then the galvano-mirror control loop is disconnected when there is a seeking operation by the LM 28, while when the switching circuit is turned ON, then the galvano-mirror control loop is connected when there is a tracking operation.

The signal selection circuit 38 selects one of the signals inputted into its two input terminals based on the control signal from the seeking control circuit 36. One terminal of the signal selection circuit 38 is connected to the output of the phase compensation circuit 22 while the other input terminal is connected to the output of the signal selection circuit 39. When tracking control is operational, the signal selection circuit 38 selects the tracking error signal from the phase compensation circuit 22, while when seeking is operational for the LM 28, then it selects the output of the signal selection circuit 39.

The signal selection circuit 39 selects one of the signals inputted into its two input terminals based on the control signal from the seeking control circuit 36. One terminal of the signal selection circuit 38 is connected to the output of the brake pulse generation circuit 41, while the other input terminal is connected to the output terminal of the D/A convertor 40. When the LM 28 is being driven under a seeking operation, the signal selection circuit 39 selects the LM driving value from the D/A convertor 40, while when a braking operation being executed for the LM 28 then it selects the output of the brake pulse generator circuit 41.

The D/A convertor 40 converts the LM driving value from the seeking control circuit 36 into an analogue signal.

The brake pulse generation circuit 41 generates the brake pulse based on the detected velocity from the velocity detector 35.

(Tracking Control)

Under the construction shown in FIG. 3, when tracking control is operational, the switching circuit 37 is turned ON, and by means of the signal selection circuit 38 selecting the signal from the phase compensation circuit 22, then the galvano-mirror control loop and the LM control loop are formed in the same way as the construction shown in FIG. 1. In this way, tracking control is executed by the galvano-mirror 27 and the LM 28 based on the tracking error signal in the same way as the construction shown in FIG. 1. Since tracking control by the construction shown in FIG. 1 has already been explained, such explanation has been omitted here.

(Track Seeking Operation)

The following is an explanation of a track seeking operation (hereafter, the seeking operation) which moves the light spot from an arbitrary track to an intended track on the disc 7.

As described above, the seeking operation is executed by controlling the driving of the LM 28. When a seeking operation is executed, the signal selection circuit 38 selects the output of the signal selection circuit 39, with the signal selection circuit 39 selecting the signal from the D/A convertor 40. In doing so, the signal from the seeking control circuit 36 is inputted into the LM driving circuit 26 having passed through the D/A convertor 40, the signal selection circuit 39, and the signal selection circuit 38, with the LM 28 being driven by the output of the LM driving circuit 26.

At such a time, the switching circuit 37 is set at OFF, so that the galvano-mirror control loop is disconnected. In this way, the mirror part of the galvano-mirror 27 returns to the angle at which it was originally installed by the means of an inbuilt spring.

During seeking, the tracking error signal which is the output of the divider 18 is converted into a two state signal by the two state circuit 19 and then inputted into the velocity detector 35. The velocity detector 35 then counts the time between the down edges of the two state tracking error signal and calculates the time taken to move the moving part across the tracks of the disc 7, before finding the real movement velocity "vreal" of the light spot across the tracks from the calculated time and the distance between the tracks (track pitch). The output from the two state circuit 19 is also outputted into the seeking control circuit 36 which then counts the number of tracks traversed by the light spot.

Once the total light amount signal has been inputted from the summing amplifier 16 into the signal processing circuit 32, it is then converted into a digital signal by the A/D convertor 33 and inputted into the seeking control circuit 36. In this way, the seeking control circuit 36 can retrieve the present address of the light spot during tracking control from the total light amount signal. That is to say, the address information about the present position of the light spot before the seeking operation is begun and after the seeking operation has been completed is obtained from the A/D convertor 33.

The seeking control circuit 36 detects the present address of the light spot before the seeking operation is begun from the address signal from the A/D convertor 33 and the two state TE signal from the two state circuit 19, and, by finding the difference between the track address of the intended seeking track and the detected address, finds the number of tracks to be crossed when moving between the present address before seeking and the intended track. While the LM 28 is executing the seeking operation, the seeking control circuit 36 can detect the position of the light spot during seeking by counting the pulses in the two state TE signal. In doing so, the seeking control circuit 36 can control the driving of the LM 28 so as to keep the velocity at which the light spot traverses the tracks constant at velocity predetermined for each of the fixed areas between the position of the light spot before seeking and the intended track, in accordance with the real movement velocity of the light spot vreal detected by the velocity detector 35. More specifically, the LM 28 is driven at a high velocity at the start of the seeking operation, but is temporarily slowed to a relatively slower velocity which is decided beforehand as the intended velocity when it reaches a position decided beforehand, which is just before the application of the brake pulse, so that it is driven at this intended velocity until the brake pulse is applied.

The following is an explanation of the leading-in of the tracking servo after seeking.

During the seeking operation, the seeking control circuit 36 finds the address of the track where the light spot is currently positioned from the address before seeking, the intended address and the number of tracks crossed, and once the present position of the light spot is at a position 1.5 tracks before the intended track, it sends a brake timing signal (hereafter BTS) to the brake pulse generation circuit 41 so that it supplies a brake pulse to the LM 28.

The signal selection circuit 39 selects the signal from the brake pulse generation circuit 41 in accordance with the timing of the BTS. In this way, the brake pulse generation circuit 41 supplies the brake pulse to the LM 28 in accordance with the BTS and the velocity of the light spot is further reduced as it falls upon the intended track. The seeking control circuit 36 has the signal selection circuit 38 select the tracking error signal from the phase compensation circuit 22 at the point at which the light spot crosses the intended track, and by switching the switching circuit 37 from OFF to ON leads in the tracking servo.

However, for the tracking control system of FIG. 1 constructed according to the related art, because of the effect of eccentricities in the track or due to the load of the flexi-substrate, the light spot may continue past the intended track, or may come back away from it, so that there has been the problem that tracking has been unbalanced.

Also, the tracking control system of FIG. 3 constructed according to the related art has had the problem of not being able to actually lead in the light spot after the seeking operation to the intended track due to the effects of eccentricities in the track or due to the load of the flexi-substrate, so that the light spot may continue past the intended track, or may come back away from it, meaning that the seeking time can vary widely, and as a result the efficiency of the optical disc apparatus and its reliability may be greatly reduced.

More specifically, when a still jump is executed, a still jump signal is supplied to the galvano-mirror 27 and a track jump is executed, and, during the still jump, the LM 28 is driven by the LM driving value (a constant value) held by the S/H circuit 23. Therefore, in response to the effects caused by eccentricities in the track on the disc 7 or by the load of the flexi-substrate wiring of the LM 28, it becomes necessary to execute tracking control using only the galvano-mirror 27 when executing tracking during a still jump moving only the galvano-mirror 27.

In response to this, by inputting the tracking error signal into the galvano-mirror 27 via the divider 18, the phase compensator 20, and the summing amplifier 24 when there is a still jump, then the information which shows tracking errors due to the effects caused by eccentricities in the track on the disc 7 or by the load of the flexi-substrate wiring of the LM 28 can be given in the low frequency part of the tracking error signal. However, since the gain of the galvano-mirror 27 for the low frequency part of the tracking error signal is low, it is unable to sufficiently operate in accordance with the low frequency part of the tracking error signal.

Also, since the weight of the movable part was so considerable under the related art before the introduction of separated optical systems, even if there were disturbing effects on the movable part such as those caused by a flexi-substrate, the effect on tracking would have been so small as to have been negligible. On the contrary, for separated optical systems, since the weight of the movable part has been reduced, then the effect of the load and suchlike of the flexi-substrate on the LM 28 which moves the movable part becomes significant, causing tracking errors for the light spot so that the effects on tracking can no longer be overlooked. Moreover, since this kind of tracking error caused by the load and suchlike of the flexi-substrate is in the gain area of the LM 28, then when tracking control is not carried out by the LM 28, due to this kind of disturbing effect, it is not possible to have the light spot follow the track correctly.

Also, since the size of effects on the LM 28 due to the load of the flexi-substrate differ in the inside, in the center, and in the outside of the disc 7, and, additionally, tracking errors of the light spot which are caused by eccentricities in the track on the disc 7 differ with the technique used to construct each of the discs 7 and the condition of the disc 7 on insertion into the optical disc apparatus, then since the effects on tracking are different at the point at which the execution of a still jump is attempted, then it has been very difficult to execute still jump control so that the light spot is made to jump onto the intended track.

Additionally, when performing a seeking operation, if there are effects such as those caused by the load and suchlike of the flexi-substrate described above, then there will be large deviations in velocity regardless of whether velocity control is executed, and there will be great variations in the velocity just before the brake pulse is applied. As a result, there will also be great variations in the velocity of the light spot when leading-in the tracking servo after the brake pulse has been applied. If there are great variations in velocity at the point when the intended track is reached, then the light spot will not be led into the intended track and may pass by it, or, alternatively, have its velocity excessively reduced so that it moves back in the opposite direction. Therefore, in order to be able to appropriately reduce the velocity of the light spot when there are great differences in the velocity before the brake pulse is applied, then the brake pulse generation circuit 41 generates the brake pulse based on the movement velocity vreal of the light spot detected by the velocity detector 35 before the brake pulse is applied.

However, even when the brake pulse has been applied to the LM 28 based on the movement velocity vreal of the light spot just before the brake pulse is applied, by means of velocity control executed by the seeking control circuit 36, if the movement velocity vreal of the light spot before the brake pulse is applied reaches the intended velocity v0, then the size of the brake pulse applied to the LM 28 will be a constant value, and so not related to the existence or size of a disturbance. Velocity control is executed by means of the LM driving value supplied from the seeking control circuit 36 before the brake pulse is applied, but neither tracking control nor velocity control of the LM 28 is performed during the interval from the application of the brake pulse to the leading in of the tracking servo. Because of this, even when velocity control of the LM 28 is properly executed, then for the leading-in of the tracking servo, there can still be the problems of the light spot passing beyond the intended track, or coming back the other way.

The following is a further explanation of the leading-in of the tracking servo after seeking, with reference to FIG. 4. In FIG. 4, the movement velocity vreal of the light spot just before the brake pulse is applied, is the intended velocity v0, and the symbol [·] on the TE signal in FIGS. 4A–4C marks the center of the intended track.

FIG. 4A shows the waveform of the TE signal and the brake pulse when there is no interference due to the load and suchlike of the flexi-substrate, when leading-in the tracking servo after a seeking operation in the inside of the disc 7.

The movement velocity of the light spot vreal is found by measuring the time TW of one cycle of the TE signal. A brake pulse of amplitude HBK0 and pulse width WBK0 based on the movement velocity of the light spot vreal (=v0) found in this way is then applied to the LM 28 at a point 1.5 tracks before the intended track.

FIG. 4B shows the waveform of the TE signal and the brake pulse when there is disturbance due to the load and suchlike of the flexi-substrate directed toward the inside of the disc, when leading-in the tracking servo after a seeking operation in the inside of the disc 7.

As shown in FIG. 4B, when there is a disturbance towards the inside, then the movement velocity vreal of the light spot just before the brake pulse is applied, despite being subject to velocity control to slow it to the intended velocity, will in fact be somewhat faster than the intended velocity v0, so that the brake pulse in shown FIG. 4B having an amplitude HBK0 set somewhat larger than the brake pulse in FIG. 4A is applied to the LM 28. However, the TE signal shown in FIG. 4B shows that as soon as the velocity control is turned OFF due to the BTS signal, then there will be an insufficient reduction in velocity with the brake pulse due to the disturbance towards the inside, so that the light spot will continue on past the intended track.

FIG. 4C shows the waveform of the TE signal and the brake pulse when there is disturbance due to the load and suchlike of the flexi-substrate directed from the inner to the outside of the disc 7 (hereafter, outward direction), when leading-in the tracking servo after a seeking operation in the inside of the disc 7. As shown in FIG. 4C, a brake pulse having an amplitude HBK0 lower than that in FIG. 4A is applied to the LM 28. However, the TE signal shown in FIG. 4C shows that the as soon as the velocity control is turned OFF due to the BTS signal, then there will be an excessive reduction in velocity with the brake pulse due to the disturbance in the outer direction, so that the light spot will start moving back in the opposite direction.

SUMMARY OF THE INVENTION

The object of the present invention is to provide a tracking control system which can handle the effects due to eccentricities in the track on the disc and the load and suchlike of the flexi-substrate, and hence execute stabilized track jumps over the entire area of a disc.

The above object can be achieved by the tracking control system of comprising: a light focusing unit for focusing a light beam from a light source on a recording medium; a first tracking unit, which has a special preference for high frequency signals, for moving a focused spot of the light beam focused by the light focusing unit across tracks on the recording medium; a second tracking unit, which has a special preference for signals of a lower frequency than the first tracking unit, for moving the focused spot across a wider area of the tracks on the recording medium than the first tracking unit; a tracking error signal generation unit for detecting that the focused spot has deviated from the track based on a reflected light when the light beam is reflected back from the recording medium, and for generating a tracking error signal which shows that the detected focused beam has deviated from the track;a first driving control unit for applying a first driving signal to the first tracking unit according to the tracking error signal and controlling a driving of the first tracking unit so that the focused spot follows the track; a second driving control unit for applying a second driving signal to the second tracking unit according to a low frequency part of the tracking error signal and controlling a driving of the second tracking unit so that the focused spot follows the track; a still jump signal generation unit for temporarily stopping a control of the second driving control unit, and for generating a still jump signal based on the second driving signal just before the control of the second driving control unit is temporarily stopped, consisting of a jump pulse and a brake pulse, which has the first tracking unit perform a still jump; and a still jump signal addition unit for adding, just after the control of the second driving control unit has been temporarily stopped, the still jump signal generated by the still jump signal generation unit to the first driving signal.

The second driving control unit may include: a sample/hold unit for having the tracking error signal inputted, for outputting the inputted tracking error signal as it is when in a sample mode, and, for storing a value of the tracking error signal just before a hold mode becomes operational and then outputting the tracking error signal, when in a hold mode; a second driving signal generation unit for generating the second driving signal in accordance with a value in the tracking error signal inputted via the sample/hold unit; and a second driving unit for driving the second tracking unit by applying the second driving signal generated by the second driving signal generation unit to the second tracking unit, and the still jump signal generation unit may include: a sample/hold control unit for controlling the sample/hold unit so that it is set onto hold mode when the control of the second driving control unit is temporarily stopped and is set onto sample mode when the second driving control unit is not stopped; a jump pulse generation unit for generating the jump pulse; and a brake pulse generation unit for generating the brake pulse.

The jump pulse generation unit may additionally include a jump pulse calculation unit for calculating at least one of an amplitude and a pulse width of the jump pulse based on the value stored by the sample/hold unit, wherein the jump pulse generation unit may generate the jump pulse using a calculated result of the jump pulse calculation unit.

The jump pulse calculation unit may further include: a jump pulse amplitude calculation unit for calculating the amplitude of the jump pulse, set as HJP, according to an equation below, $$HJP = KJP1 \cdot HJPC + KJP2 \cdot VD$$

where VD is the value stored in the sample/hold unit, HJPC is a constant and KJP1 and KJP2 are constants of proportionality, including a case when KJP1 and KJP2 are equal; and a jump pulse width calculation unit for calculating the pulse width of the jump pulse, set as WJP, according to an equation below, $$WJP = TJP1 \cdot WJPC + TJP2 \cdot VD$$

where VD is the value stored in the sample/hold unit, WJPC is a constant and TJP1 and TJP2 are constants of proportionality, including a case when TJP1 and TJP2 are equal.

The brake pulse generation unit may include a brake pulse calculation unit for calculating at least one of an amplitude and a pulse width of the brake pulse based on the value stored by the sample/hold unit, wherein the brake pulse generation unit generates the brake pulse using a calculated result of the brake pulse calculation unit.

The brake pulse calculation unit may further include: a brake pulse amplitude calculation unit for calculating the amplitude of the brake pulse, set as HBRK, according to an equation below, $$HBRK = KBRK1 \cdot HBRKC - KBRK2 \cdot VD$$

where VD is the value stored in the sample/hold unit, HBRKC is a constant and KBRK1 and KBRK2 are constants of proportionality, including a case when KBRK1 and KBRK2 are equal; and a brake pulse width calculation unit for calculating the pulse width of the brake pulse, set as WBRK, according to an equation below, $$WBRK = TBRK1 \cdot WBRKC - TBRK2 \cdot VD$$

where VD is the value stored in the sample/hold unit, WBRKC is a constant and TBRK1 and TBRK2 are constants of proportionality, including a case when TBRK1 and TBRK2 are equal.

The brake pulse generation unit may include: a first brake pulse amplitude calculation unit for calculating an amplitude of a first brake pulse, based on the value stored by the sample/hold unit; and a second brake pulse width calculation unit for calculating a pulse width of a second brake pulse, based on the value stored by the sample/hold unit, wherein the brake pulse generation unit may generate a brake pulse consisting of the first brake pulse whose amplitude is calculated by the first brake pulse amplitude calculation unit and the second brake pulse whose pulse width is calculated by the second brake pulse width calculation unit.

The first brake pulse amplitude calculation unit may calculate the amplitude of the first brake pulse, set as H1BRK, using an equation given below, $$H1BRK = KBRK3 \cdot H1BRKC - KBRK4 \cdot VD$$

where VD is the value stored in the sample/hold unit, H1BRKC is a constant and KBRK3 and KBRK4 are constants of proportionality, including a case when KBRK3 and KBRK4 are equal; and the second brake pulse width calculation unit may calculate the pulse width of the second brake pulse, set as W2BRK, according to an equation given below, $$W2BRK = TBRK3 \cdot W2BRKC - TBRK4 \cdot VD$$

where VD is the value stored in the sample/hold unit, W2BRKC is a constant and TBRK3 and TBRK4 are constants of proportionality, including a case when TBRK3 and TBRK4 are equal.

Another object of the present invention is to provide a tracking control system which can handle the effects due to eccentricities in the track on the disc and the load and suchlike of the flexi-substrate, and hence execute stabilized track seeking operations.

The above object can be achieved by the tracking control system comprising: a light focusing unit for focusing a light beam from a light source on a recording medium; a first tracking unit, which has a special preference for high frequency signals, for moving a focused spot of the light beam focused by the light focusing unit across tracks on the recording medium; a second tracking unit which has a special preference for signals of a lower frequency than the first tracking unit, for moving the focused spot across a wider area of the tracks on the recording medium than the first tracking unit; a tracking error signal generation unit for detecting that the focused spot has deviated from the track based on a reflected light when the light beam is reflected back from the recording medium, and for generating a tracking error signal which shows that the detected focused beam has deviated from the track; a first driving control unit for applying a first driving signal to the first tracking unit according to the tracking error signal and controlling a driving of the first tracking unit so that the focused spot follows the track; a second driving control unit for applying a second driving signal to the second tracking unit according to a low frequency part of the tracking error signal and controlling a driving of the second tracking unit so that the focused spot follows the track; a seeking driving unit for temporarily stopping control by the first driving control unit and the second driving control unit, and for driving the second tracking unit so that the focused spot moves from its present position towards an intended seeking track by applying a predetermined seeking driving signal to the second tracking unit; a velocity detection unit for detecting a velocity of the focused spot crossing the tracks; an address detection unit for detecting an address of a track where the focused spot is presently positioned based on the reflected light reflected back off the recording medium; a velocity control unit for controlling the seeking driving unit so that the velocity of the focused spot crossing the tracks on the recording medium is a velocity predetermined for each position of the focused spot relative to the intended seeking track, based on the detected velocity and the detected address; a brake pulse generation unit for generating a brake pulse for driving the second driving unit in a direction which is opposite to a driving direction of the seeking driving unit, based on the velocity of the focused spot just before it reaches an edge of the area closest to the intended seeking track and the seeking driving signal at a same point; and a braking unit for temporarily stopping the seeking driving unit when the focused spot has reached the edge of the area closest to the intended seeking track and for slowing the second tracking unit by applying the generated brake pulse to the second tracking unit.

The brake pulse generation unit may include a brake pulse calculation unit for calculating at least one of an amplitude and a pulse width of the brake pulse, based on the velocity of the focused spot just before it reaches the edge of the area closest to the intended seeking track and the seeking driving signal at a same point, wherein the brake pulse generation unit may generate the brake pulse using a calculation result of the brake pulse calculation unit.

The brake pulse calculation unit may include: a brake pulse amplitude calculation unit for calculating the amplitude of the brake pulse, set as HBK, using an equation given below, $$HBK=KBK(vreal-KSD \cdot VSD-HC)$$

with vreal–KSD·VSD>0 and vreal–KSD·VSD–HC>0 where vreal is the velocity of the focused spot just before it reaches the edge of the area closest to the intended seeking track, VSD is the seeking driving signal at a same point, KBK and KSD are constants of proportionality and HC is a constant; and a brake pulse width calculation unit for calculating the pulse width of the brake pulse, set as WBK, according to an equation given below, $$WBK=TBK(vreal-TSD \cdot VSD-WC)$$

with vreal–TSD·VSD>0 and vreal–TSD·VSD–WC>0 where TBK and TSD are constants of proportionality and WC is a constant.

The brake pulse generation unit may include: a first brake pulse amplitude calculation unit for calculating an amplitude of the first brake pulse, based on the velocity of the focused spot just before it reaches the edge of the area closest to the intended seeking track and the seeking driving signal at a same point; and a second brake pulse width calculation unit for calculating a pulse width of the second brake pulse, based on the velocity of the focused spot just before it reaches the edge of the area closest to the intended seeking track and the seeking driving signal at a same point, wherein the brake pulse generation unit may generate a brake pulse consisting of the first brake pulse whose amplitude is calculated by the first brake pulse amplitude calculation unit and the second brake pulse whose pulse width is calculated by the second brake pulse width calculation unit.

The first brake pulse amplitude calculation unit may calculate the amplitude of the first brake pulse, set as H1BK, using an equation given below, $$H1BK=K1BK(vreal-K1SD \cdot VSD-H1C)$$

with vreal–K1SD·VSD>0 and vreal–K1SD·VSD–H1C>0 where vreal is the velocity of the focused spot just before it reaches the edge of the area closest to the intended seeking track, VSD is the seeking driving signal at a same point, K1BK and K1SD are constants of proportionality and H1C is a constant; and the second brake pulse width calculation unit may calculate the pulse width of the second brake pulse, set as W2BK, according to an equation given below, $$W2BK=T2BK(vreal-T2SD \cdot VSD-W2C)$$

with vreal–T2SD·VSD>0 and vreal–T2SD·VSD–W2C>0 where T2BK and T2SD are constants of proportionality and W2C is a constant.

The brake pulse amplitude calculation unit may calculate an amplitude of the brake pulse, set as HBK, using an equation given below, $$HBK=KBK(HC-KSD \cdot VSD)$$

with HC–KSD·VSD>0 where VSD is the value of seeking driving signal just before the focused spot reaches the edge of the area closest to the intended seeking track, KBK and KSD are constants of proportionality and HC is a constant; and
brake pulse width calculation unit may calculate the pulse width of the brake pulse, set as WBK, according to an equation given below, $$WBK=TBK(vreal-WC)$$

with vreal–WC>0 where vreal is the velocity of the focused spot just before it reaches the edge of the area closest to the intended seeking track, TBK and TSD are constants of proportionality and WC is a constant.

Using this construction, it becomes possible to have balanced track jump operations executed across the whole area of a variety of discs, even if there are effects due to a variety of eccentricities in the track on the disc or the load in the flexi-substrate which comprises the wiring for the linear motor.

It also becomes possible to have balanced track seeking operations executed across the whole area of a variety of discs, even if there are effects due to the load and suchlike in the flexi-substrate.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4A is a wave diagram showing the waveform of the TE signal and the brake pulse signal when there is no disturbance from the load and suchlike of the flexi-substrate, for a leading-in operation of the tracking servo after a seeking operation in the inside of the disc 7;

FIG. 4B is a wave diagram showing the waveform of the TE signal and the brake pulse signal when there is disturbance from the load and suchlike of the flexi-substrate directed towards the inside of the disc 7, for a leading-in operation of the tracking servo after a seeking operation in the inside of the disc 7;

FIG. 4C is a wave diagram showing the waveform of the TE signal and the brake pulse signal when there is disturbance from the load and suchlike of the flexi-substrate directed in the outward direction, for a leading-in operation of the tracking servo after a seeking operation in the inside of the disc 7;

FIG. 6A is a wave diagram showing the TE signal when a still jump is performed;

FIG. 6B is a wave diagram showing the two state TE signal when a still jump is performed;

FIG. 6C is a wave diagram showing the S/H signal when a still jump is performed;

FIG. 6D is a wave diagram showing the still jump signal when a still jump is performed, when the wave amplitude is controlled in response to an outer load force in the LM 28;

FIG. 6E is a wave diagram showing the still jump signal when a still jump is performed, when the wave amplitude is controlled in response to an inner load force in the LM 28;

FIG. 7A is a wave diagram showing the TE signal when a still jump is performed;

FIG. 7B is a wave diagram showing the two state TE signal when a still jump is performed;

FIG. 7C is a wave diagram showing the S/H signal when a still jump is performed;

FIG. 7D is a wave diagram showing the still jump signal when a still jump is performed, when the pulse width is controlled in response to an outer load force in the LM 28;

FIG. 7E is a wave diagram showing the still jump signal when a still jump is performed, when the pulse width is controlled in response to an inner load force in the LM 28;

DESCRIPTION OF THE PREFERRED EMBODIMENTS

The following is an explanation of the tracking control system in the embodiment of the present invention with reference to the drawings.

Figure 1:
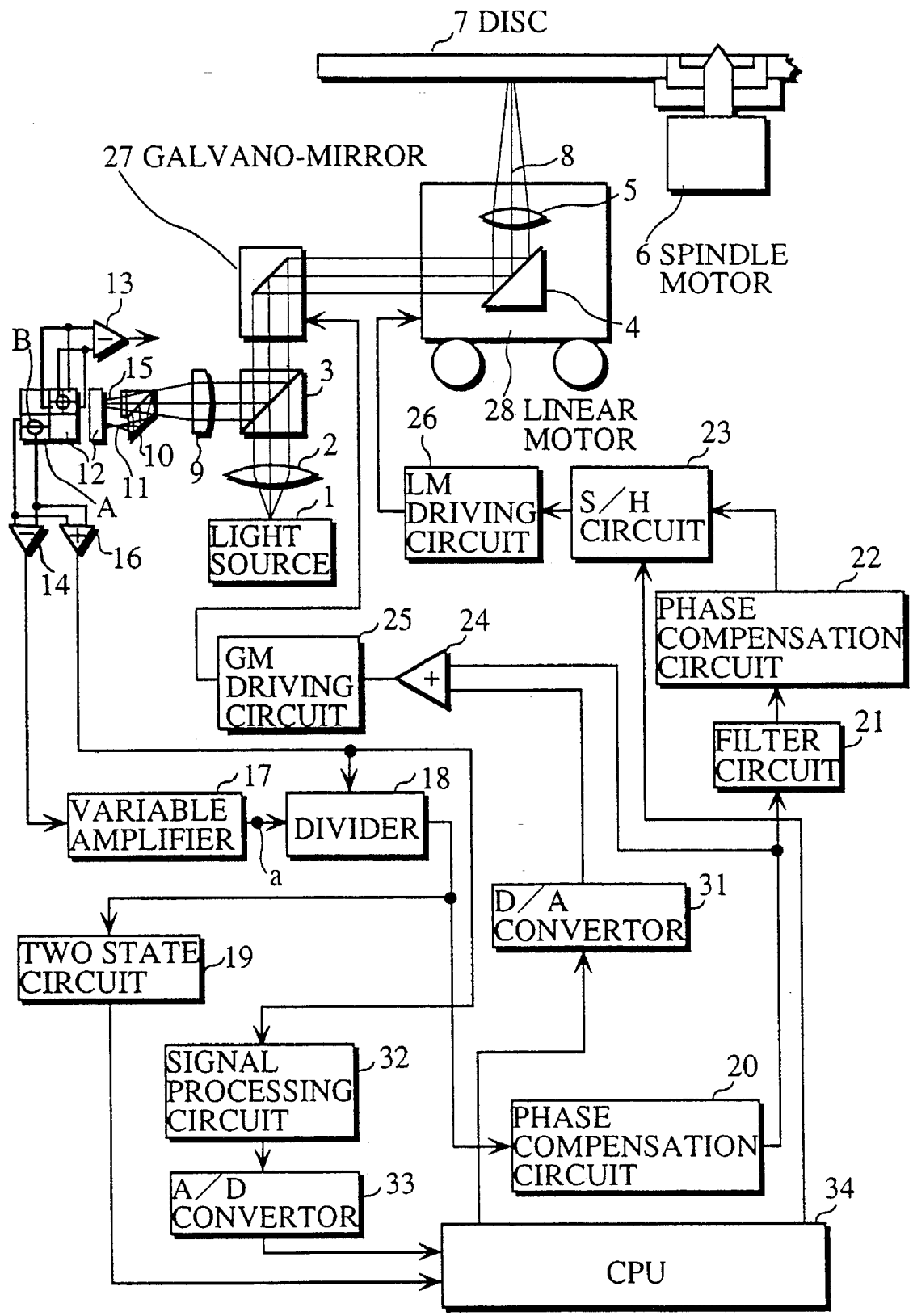
FIG. 1 is a block diagram showing the construction of the part of a tracking control system which relates to a still jump operation under the related art.
Figure 2A:
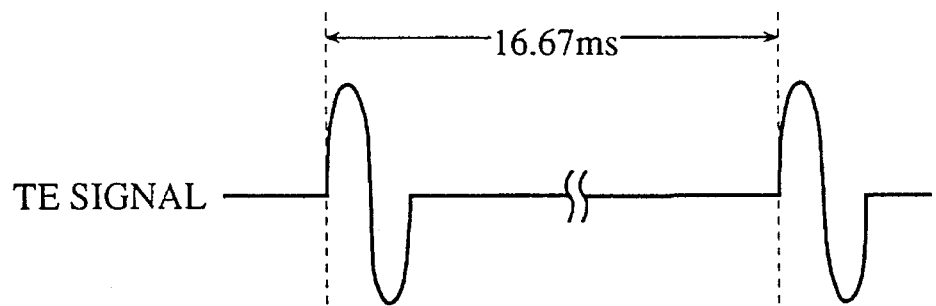
FIG. 2A is a wave diagram showing the tracking error (TE) signal when a still jump is performed by the tracking control system under the related art.
Figure 2B:
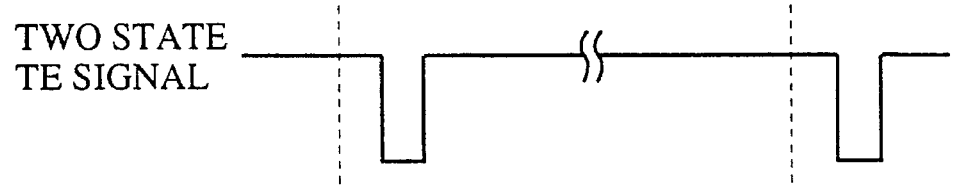
FIG. 2B is a wave diagram showing the two state TE signal when a still jump is performed by the tracking control system under the related art.
Figure 2C:
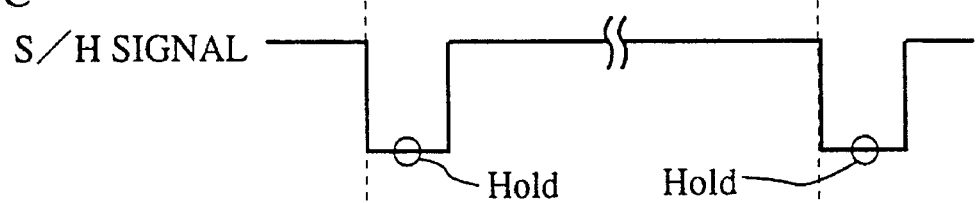
FIG. 2C is a wave diagram showing the S/H signal when a still jump is performed by the tracking control system under the related art.
Figure 2D:
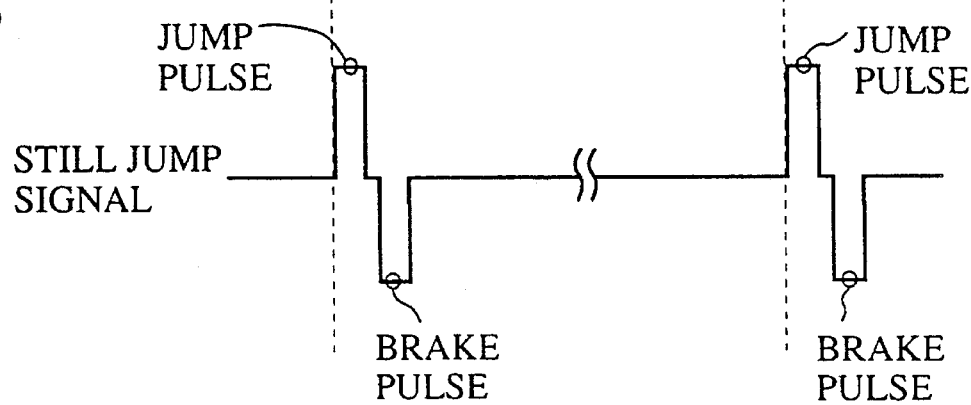
FIG. 2D is a wave diagram showing the still jump signal when a still jump is performed by the tracking control system under the related art.
Figure 5:
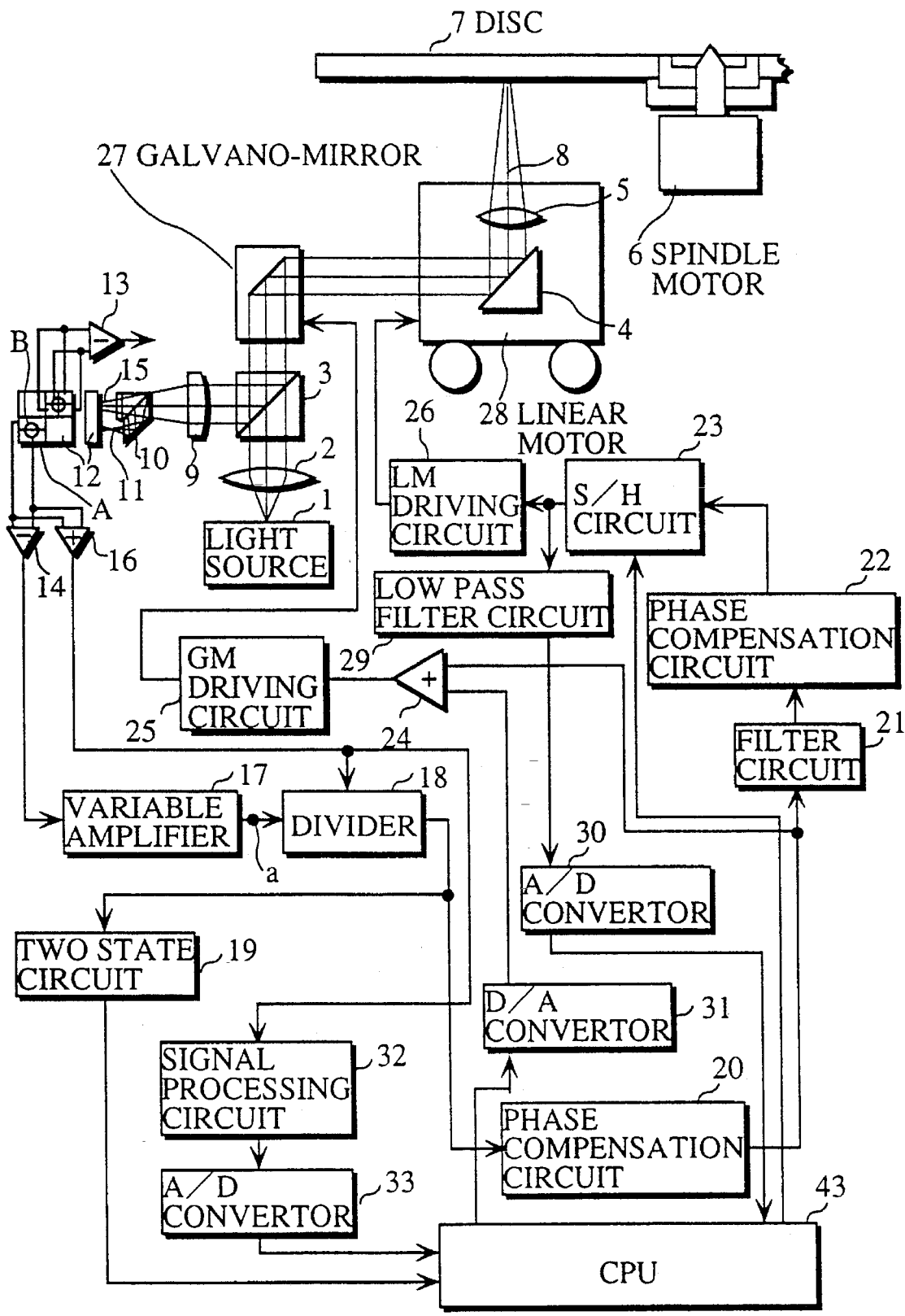
FIG. 5 is a block diagram showing the construction of the part of the tracking control system of the embodiment of the present invention which relates to a still jump operation.

FIG. 5 is a block diagram showing the construction of the part of the tracking control system of the present embodiment which relates to a still jump operation. As shown in FIG. 5, the tracking control system in the present embodiment additionally includes the following new elements; a low-pass filter 29, an A/D convertor 30 and a CPU 43. Note that the construction elements which are the same as those shown in FIG. 1 have been given the same reference numerals here, and, since they are the same, their explanation has been omitted.

The low-pass filter 29 removes high frequency noise from the output of the S/H circuit 23 during tracking control, and extracts the low frequency part of the output from the S/H circuit 23 which is 60 Hz or below.

The A/D convertor 30 converts the low frequency signal of 60 Hz or below extracted by the low-pass filter 29 and converts it into a digital signal.

The CPU 43 generates the still jump signal based on the hold value of the LM driving signal digitized by the A/D convertor 30.

In the present embodiment, since tracking control operations are executed in the same way as for a tracking control system under the related art, an explanation of such has been omitted. Still jump operations have also already been explained for the related art, so that such explanation has again been omitted.

(Still Jumps with Amplitude Control)

The following is an explanation of a still jump operation when the amplitude of the still jump signal is being controlled, with reference to FIG. 5, FIGS. 6A–6E, FIG. 10, and FIG. 11.

The generation of the jump pulse is executed by the CPU 43. The jump pulse data from the CPU 43 is converted into an analogue signal by the D/A convertor 31 and is inputted into the summing amplifier 24. At the same time as the still jump signal is added to the galvano-mirror control loop, the LM driving signal just before the application of the still jump signal is held by the S/H circuit 23 in the LM loop. The held LM driving signal is inputted into the A/D convertor 30 via the low-pass filter 29 which is a newly added construction element in the present embodiment. The LM driving signal digitized by the A/D convertor 30 is then inputted into the CPU 43.

The amplitude of the jump pulse is controlled in accordance with the LM driving value just before the application of the jump pulse. In this case, the pulse width is set at a constant value. By applying the jump pulse to the galvano-mirror control loop, the light spot can perform a track jump. As the light spot crosses the center of one track, then the voltage of the tracking error signal becomes equal to a standard voltage. When the voltage of the tracking error signal becomes equal to the standard voltage, then the GM driving circuit 25 applies the brake pulse to the galvano-mirror control loop and ends the still jump.

The following is an explanation of the timing of the still jump with reference to FIGS. 6A–6E. FIG. 6A is a wave diagram showing the TE signal when a still jump is performed. FIG. 6B is a wave diagram showing the two state TE signal when a still jump is performed. FIG. 6C is a wave diagram showing the S/H signal when a still jump is performed. FIG. 6D is a wave diagram showing the still jump signal when a still jump is performed, when the wave amplitude is controlled in response to an outer load force in the LM 28. FIG. 6E is a wave diagram showing the still jump signal when a still jump is performed, when the wave amplitude is controlled in response to an inner load force in the LM 28.

As shown in FIG. 6D, when there is a disturbance due to the load and suchlike of the flexi-substrate in the outward direction of the disc 7, then the amplitude of the jump pulse is increased, and amplitude of the brake pulse following the still jump is reduced. As shown in FIG. 6E, when there is a disturbance due to the load of the flexi-substrate in the inward direction of the disc 7, then the amplitude of the jump pulse is reduced, and amplitude of the brake pulse following the still jump is increased. FIGS. 6D, 6E give one example of the control of the amplitude of the jump pulse and/or the brake pulse in the still jump signal in response to the disturbing effects of the load in the inward/outward direction of the tracks for the LM 28, but, regarding the disturbing effects caused by eccentricities in the track, the amplitude of the still jump signal can be controlled in the same way in accordance with the driving value of LM 28 held by the S/H circuit 23.

Figure 10:
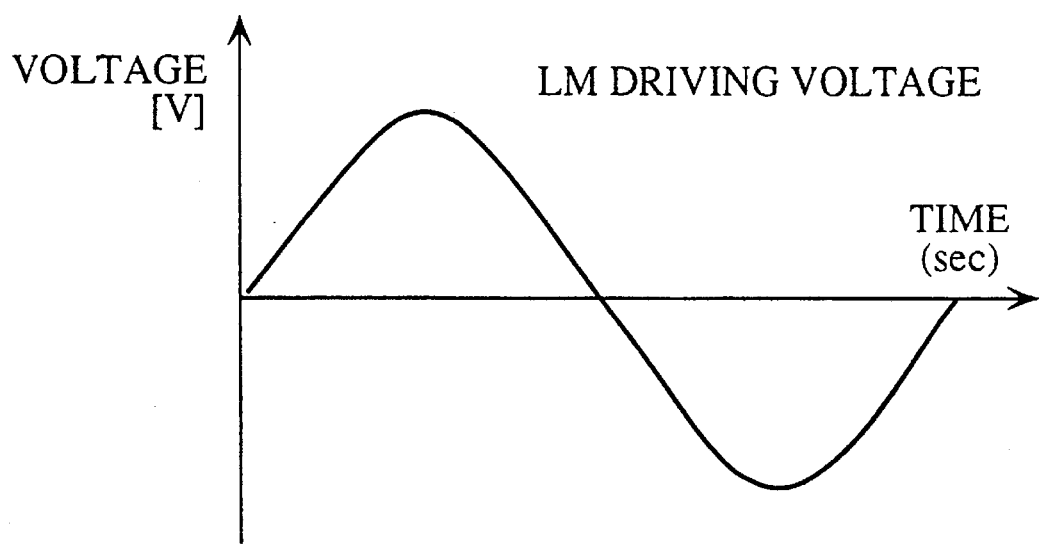
FIG. 10 is a wave diagram showing the LM driving signal when tracking control is being executed in response to only eccentricities in the track without a load or suchlike in the flexi-substrate.
Figure 11:
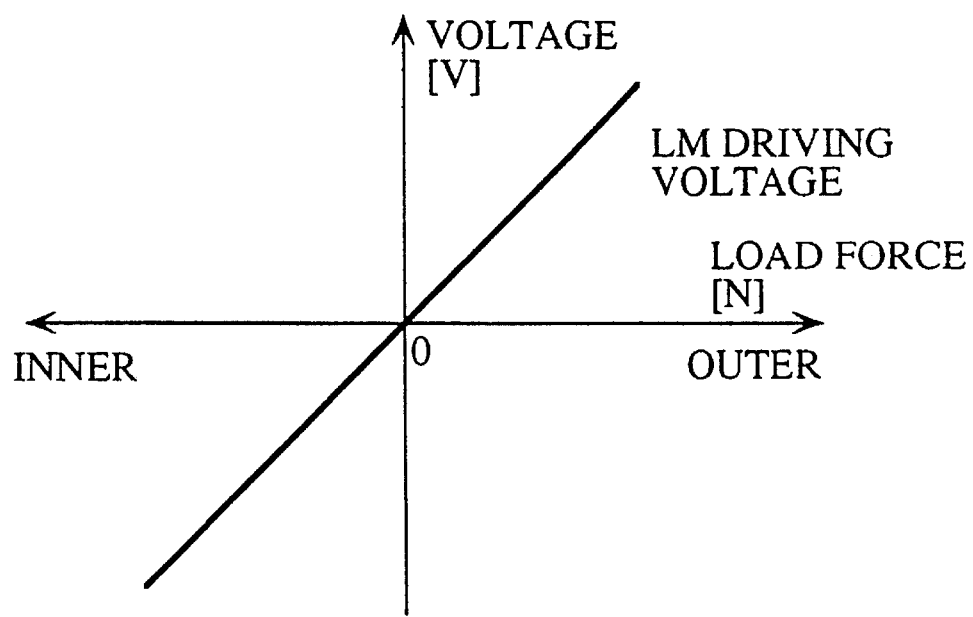
FIG. 11 is a graph showing the relation of the size and the polarity of the LM driving signal to the size and the direction of the disturbance due to the load and suchlike of the flexi-substrate.

The following is a description of the control of the jump pulse using the drawings, FIGS. 6A–6E, FIG. 10, and FIG. 11. FIG. 10 is a wave diagram showing the LM driving signal when tracking control is being executed in response to only eccentricities in the track without a load or suchlike in the flexi-substrate, while FIG. 11 is a graph showing the relation of the size and the polarity of the LM driving signal to the size and the direction of the disturbance due to the load and suchlike of the flexi-substrate.

As shown in FIG. 10, the LM driving voltage for having the light spot follow the track in response to eccentricities in the track is expressed as the LM driving signal which is in the form of a sine wave whose cycle is in phase with the rotation of the disc 7 with respect to the standard voltage value of the LM driving voltage for tracking control. The amplitude of the eccentricities in the track from the center of rotation of the disc 7 differs with the position of the light spot when it is about to start the still jump, and also differs with any physical differences in the disc 7 inserted into the optical disc apparatus, for example, when the hole in the disc 7 for placing the disc 7 on the rotation axis of the spindle motor 6 is positioned off-center. Also, even if the same disc 7 is inserted in the same optical disc apparatus, then, depending for example on the inserted condition of the disc 7 in said optical disc apparatus, the amplitude of said eccentricities in the track on the disc 7 will differ. Since the amplitude of the eccentricities in the track from the center of rotation of the disc 7 changes with the position of the light spot on the disc 7, on the formation of the track on the disc 7 and on the inserted condition of the disc 7, then the LM driving value for tracking control changes in response to these factors. The size of the LM driving value changes roughly in proportion to the size of the eccentricities in the track.

Additionally, the load of the flexi-substrate and its direction to the LM 28 change according to the relationship of the positions of the one end of the flexi-substrate which is connected to the fixed part and the other end of the flexi-substrate which is connected to the LM 28. Accordingly, the LM driving value used for tracking control by the LM 28 changes according to whether the LM 28 is positioned in the inner, the center, or the outside of the disc 7. As shown in FIG. 11, the size of the LM driving voltage which has the light spot follow the track under the load of the flexi-substrate to the LM 28 is proportional to the size of the load and suchlike of the flexi-substrate to the LM 28. Also, the polarity of the LM driving voltage changes with the direction of the load force of the flexi-substrate the LM 28. When tracking control is performed by the LM 28 against the load of the LM 28 towards the inside, then the LM driving voltage will be negative, while when tracking control is performed by the LM 28 against the load of the LM 28 towards the outside, then the LM driving voltage will be positive.

In this way, as shown in FIG. 10 or FIG. 11, if the LM driving value which executes tracking control in response to eccentricities in the track or to disturbances due to the load and suchlike of the flexi-substrate is set so that the LM driving value for tracking control just before the still jump is performed is VD, and the fundamental LM driving value for tracking control when there are no disturbances is VD0, then the change in the LM driving value ΔVD will be given by VD−VD0. However, the fundamental LM driving value VD0 for tracking control when there are no disturbances is extremely small relative to the change in the LM driving value ΔVD in becoming the LM driving value VD. Therefore the LM driving value VD can be regarded as the change in the LM driving value ΔVD, so that VD=ΔVD.

The LM driving value VD just before a still jump, is obtained by retrieving the part of the signal which is at a frequency of 60 Hz or below out of the LM driving signal held by the S/H circuit 23 just before the still jump. The output signal of the low-pass filter 29 is then inputted into the CPU 43 via the A/D convertor 30. The CPU 43 then controls the amplitude of the jump pulse in accordance with the low frequency part of the LM driving value.

As shown in FIG. 6D, when the load and suchlike of the flexi-substrate of the LM 28 is in an outward direction, then the amplitude of the jump pulse will be set a value which is relatively large compared to when the load is zero. On the other hand, the amplitude of the brake pulse will be set a value which is relatively small compared to when the load is zero. Conversely, when the load and suchlike of the flexi-substrate of the LM 28 is in an inward direction, as shown in FIG. 6E, then the amplitude of the jump pulse will be set a value which is relatively small compared to when the load is zero. On the other hand, the amplitude of the brake pulse will be set a value which is relatively large compared to when the load is zero.

The amplitude of the jump pulse and the brake pulse are found by the equations given below which take into account the relations described above. Equation 1 shows the relation between the amplitude of the jump pulse and the LM driving value, where VD is the LM driving value held by the S/H circuit 23, HJP is the amplitude of the jump pulse, HJP0 is the fundamental amplitude of the jump pulse, ΔHJP is the change between the amplitude HJP of the jump pulse in response to the effects of disturbances at the point when the still jump is made and the fundamental amplitude of the jump pulse HJP0, KJP is the constant of proportionality and HJPC is a constant.

$$HJP = KJP(HJPC + VD) = HJP0 + \Delta HJP \qquad \text{(equation 1)}$$

when HJP0=KJP·HJPC

Equation 2 shows the relation between the amplitude of the brake pulse and the LM driving value, HBRK is the amplitude of the brake pulse, HBRK0 is the fundamental amplitude of the brake pulse, ΔHBRK is the change between the amplitude HBRK of the brake pulse in response to the effects of disturbances at the point when the still jump is made and the fundamental amplitude of the brake pulse HBRK0, KBRK is the constant of proportionality and HBRKC is a constant.

$$HBRK = KBRK(HBRKC - VD) = HBRK0 - \Delta HBRK \qquad \text{(equation 2)}$$

when HBRK0=KBRK·HBRKC

The constant of proportionality KJP has several values substituted into it before the jump pulse is created, with the still jump being executed using the created jump pulse. As a result, the constant of proportionality KJP is set at the value which enables a stabilized still jump to be made, no matter where the light spot is positioned on the disc 7 when the still jump is executed. The constant of proportionality KBRK can be found in the same way.

The values of the aforementioned constants of proportionality, KJP and KBRK may also be set by executing a still jump in an area where the effects due to the eccentricities in the track or to the load and suchlike of the flexi-substrate are relatively small. Even in this case, the LM driving value changes in response to the size of the effects at the point of the still jump due to the load and suchlike in the flexi-substrate and eccentricities in the track, with the amplitude of the jump pulse and the brake pulse changing in response to the changes in the LM driving value. Therefore, the still jump signal is controlled according to changes in the LM driving value, and a stabilized still jump can always be executed.

When the adjustment of the relationships between the amplitude of the jump pulse HJP and the amplitude of the brake pulse HBRK to the held LM driving value VD just before the still jump by changing the values of the constants of proportionality, KJP and KBRK is not sufficient, then, by setting the constants of proportionality for constants HJPC and HBRKC as KJP1, KBRK1 respectively, and the constants of proportionality for the LM driving value at KJP2, KBRK2 respectively, then the relationships of the amplitude of the jump pulse HJP and the amplitude of the brake pulse HBRK respectively to the held LM driving value just before the still jump can be adjusted independently.

Equation 3 shows the relationship between the amplitude of the jump pulse found in the manner described above and the LM driving value.

$$HJP = KJP1 \cdot HJPC + KJP2 \cdot VD \qquad \text{(equation 3)}$$

Equation 4 shows the relationship between the amplitude of the brake pulse found in the manner described above and the LM driving signal.

$$HBRK = KBRK1 \cdot HBRKC - KBRK2 \cdot VD \qquad \text{(equation 4)}$$

According to the method described above, by controlling the amplitude of the jump pulse and the amplitude of the brake pulse in the still jump signal in accordance with changes in the LM driving signal, then it becomes possible to have stabilized still jumps executed over the entire area of the disc 7.

(Still Jump with Pulse Width Control)

The following is an explanation of the control of the pulse width of the still jump signal during a still jump operation, with reference to FIGS. 7A through 7E.

FIG. 7A is a wave diagram showing the TE signal when a still jump is performed. FIG. 7B is a wave diagram showing the two state TE signal when a still jump is performed. FIG. 7C is a wave diagram showing the S/H signal when a still jump is performed. FIG. 7D is a wave diagram showing the still jump signal when a still jump is performed, when the pulse width is controlled in response to a load in the LM 28 in the outward direction of disc 7. FIG. 7E is a wave diagram showing the still jump signal when a still jump is performed, for when the pulse width is controlled in response to a load in the LM 28 in the inward direction of disc 7.

As shown in FIG. 7D, when the load in the flexi-substrate to the LM 28 is in the outward direction, then the pulse width of the jump pulse is set so as to be relatively wider than when the load is zero. On the contrary, the brake pulse is set so as to be relatively narrower than when the load is zero. Conversely, when the load in the flexi-substrate is in the inward direction, as shown in FIG. 7E, then the pulse width of the jump pulse is set so as to be relatively narrower than when the load is zero. On the contrary, the brake pulse is set so as to be relatively wider than when the load is zero. In such a case, the amplitudes of the jump pulse and the brake pulse are set at a constant value. Here, when there are effects due to eccentricities in the track, then, in the same way as described above, the pulse width may be controlled in accordance with the driving signal of the LM 28.

Equation 5 shows the relation between the pulse width of the jump pulse and the LM driving value, where WJP is the pulse width of the jump pulse, WJP0 is the fundamental pulse width of the jump pulse, $\Delta$WJP is the change between the pulse width WJP of the jump pulse in response to the effects of disturbances at the point when the still jump is made and the fundamental pulse width of the jump pulse WJP0, TJP is the constant of proportionality and WJPC is a constant. VD is the same as in equation 1.

$$WJP=TJP(WJPC+VD)=WJP0+\Delta WJP \qquad \text{(equation 5)}$$

when WJP0=TJP·WJPC

Equation 6 shows the relation between the pulse width of the brake pulse and the LM driving value, WBRK is the pulse width of the brake pulse, WBRK0 is the fundamental pulse width of the brake pulse, $\Delta$WBRK is the change between the pulse width WBRK of the brake pulse and the fundamental pulse width of the brake pulse WBRK0, TBRK is the constant of proportionality and WBRKC is a constant. VD is the same as in equation 1.

$$WBRK=TBRK(WBRKC-VD)=WBRK0-\Delta WBRK \qquad \text{(equation 6)}$$

when WBRK0=TBRK·WBRKC

The constants of proportionality, TJP, TBRK can be found in the same way as the constants of proportionality, KJP, KBRK of equation 1.

When the adjustment of the relationships between the pulse width of the jump pulse WJP and the pulse width of the brake pulse WBRK to the held LM driving value VD just before the still jump by changing the values of the constants of proportionality, TJP and TBRK is not sufficient, then by setting the constants of proportionality for constants WJPC and WBRKC as TJP1, TBRK1 respectively, and the constants of proportionality for the LM driving value as TJP2, TBRK2 respectively, then the relationships of the pulse width of the jump pulse WJP and the pulse width of the brake pulse WBRK, respectively, to the held LM driving value VD just before the still jump can be independently adjusted.

Equation 7 shows the relationship between the pulse width of the jump pulse found in the manner described above and the LM driving signal.

$$WJP=TJP1\cdot WJPC+TJP2\cdot VD \qquad \text{(equation 7)}$$

Equation 8 shows the relationship between the pulse width of the brake pulse found in the manner described above and the LM driving signal.

$$WBRK=TBRK1\cdot WBRKC-TBRK2\cdot VD \qquad \text{(equation 8)}$$

According to the method described above, by controlling the pulse width of the jump pulse and the pulse width of the brake pulse in the still jump signal in accordance with changes in the LM driving signal, then it becomes possible to have stabilized still jumps executed over the entire area of the disc 7.

(Still Jump with Simultaneous Amplitude and Pulse Width Control)

The following is an explanation of the simultaneous control of the amplitude and the pulse width of the still jump signal during a still jump operation, with reference to FIGS. 8A through 8E.

Figure 8A:
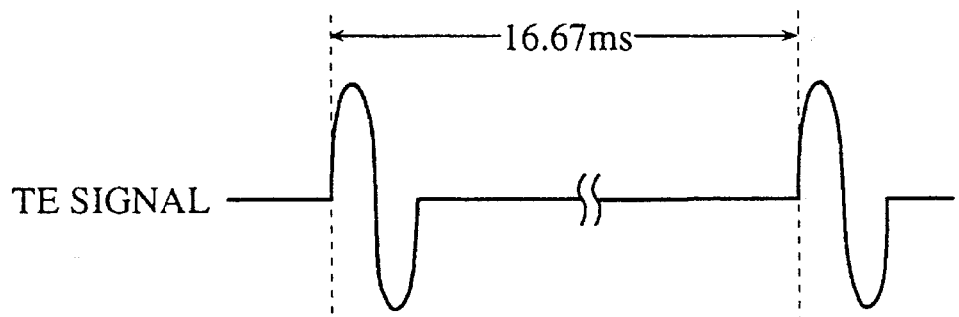
FIG. 8A is a wave diagram showing the TE signal when a still jump is performed.
Figure 8B:
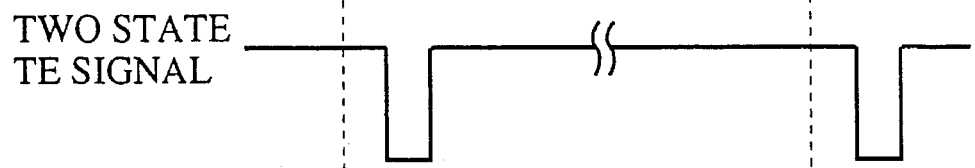
FIG. 8B is a wave diagram showing the two state TE signal when a still jump is performed.
Figure 8C:
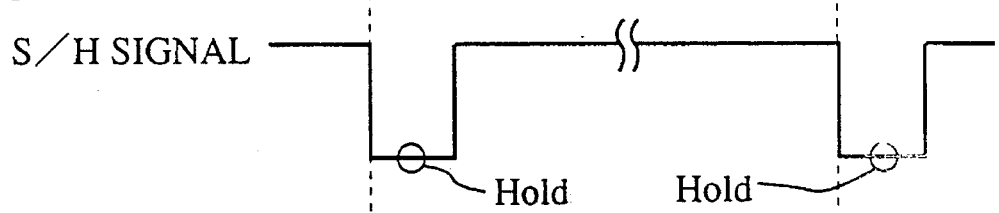
FIG. 8C is a wave diagram showing the S/H signal when a still jump is performed.
Figure 8D:
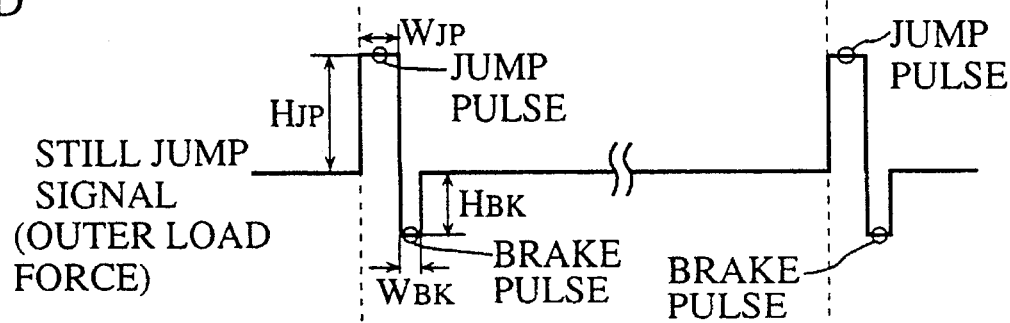
FIG. 8D is a wave diagram showing the still jump signal when a still jump is performed, when the wave amplitude and pulse width are controlled in response to an outer load force in the LM 28.
Figure 8E:
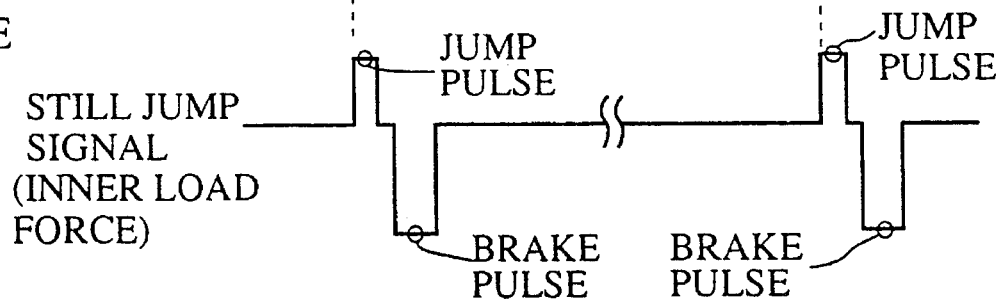
FIG. 8E is a wave diagram showing the still jump signal when a still jump is performed, when the wave amplitude and pulse width are controlled in response to an inner load force in the LM 28.

FIG. 8A is a wave diagram showing the TE signal when a still jump is performed. FIG. 8B is a wave diagram showing the two state TE signal when a still jump is performed. FIG. 8C is a wave diagram showing the S/H signal when a still jump is performed. FIG. 8D is a wave diagram showing the still jump signal when a still jump is performed, when the wave amplitude and pulse width are controlled in response to a load in the LM 28 in the outward direction of disc 7. FIG. 8E is a wave diagram showing the still jump signal when a still jump is performed, when the wave amplitude and pulse width are controlled in response to a load in the LM 28 in the inward direction of disc 7.

As shown in FIG. 8D, when the load in the flexi-substrate or suchlike is in an outward direction, then the amplitude of the jump pulse will be set a value which is relatively large compared to when the load is zero, while the pulse width will be set a value relatively wide compared to when the load is zero. On the other hand, the amplitude of the brake pulse will be set a value which is relatively small compared to when the load is zero, while the pulse width will be set a value relatively narrow compared to when the load is zero. Conversely, when the load in the flexi-substrate or suchlike is in an inward direction, as shown in FIG. 8E, then the amplitude of the jump pulse will be set a value which is relatively small compared to when the load is zero, while the pulse width will be set a value relatively narrow compared to when the load is zero. On the other hand, the amplitude of the brake pulse will be set a value which is relatively large compared to when the load is zero, while the pulse width will be set a value relatively wide compared to when the load is zero. Additionally, the amplitude and the pulse width of the still jump signal may be simultaneously controlled in accordance with the driving signal of the LM 28, in the same way as described above in response to the effects due to eccentricities in the track.

When the amplitude and the pulse width of the still jump signal are simultaneously controlled, then, as shown in equations 1 and 2, compared to when only one of the amplitude and the pulse width of the still jump signal are controlled, then since 2 sets of constants KJP, KBRK and TJP, TBRK are necessary for forming the relationship between the still jump signal and the LM driving signal, then the ratio between the constants KJP, KBRK and TJP, TBRK can be set freely. Therefore, in comparison to when just one of the amplitude or the pulse width of the still jump signal is controlled, a more precise still jump operation can be executed using the galvano-mirror 27, and a still jump which is even more stabilized can be executed over the entire area of the disc 7.

Also, when the amplitude and the pulse width of both the jump pulse and the brake pulse are simultaneously controlled, then the pulse height may be controlled using equations 3 and 4 instead of equations 1 and 2, and the pulse width may be controlled using equations 7 and 8 instead of equations 5 and 6.

(Still Jump with Amplitude Control in a First Pulse and Pulse Width Control in a Second Pulse)

Here, a still jump is executed by a jump pulse which is comprised of a first jump pulse and a second jump pulse and a brake pulse which is comprised of a first brake pulse and a second brake pulse. The following is an explanation of the control of the amplitude of the first respective pulses and the pulse width of the second respective pulses during a still jump operation, with reference to FIGS. 9A through 9E.

Figure 9A:
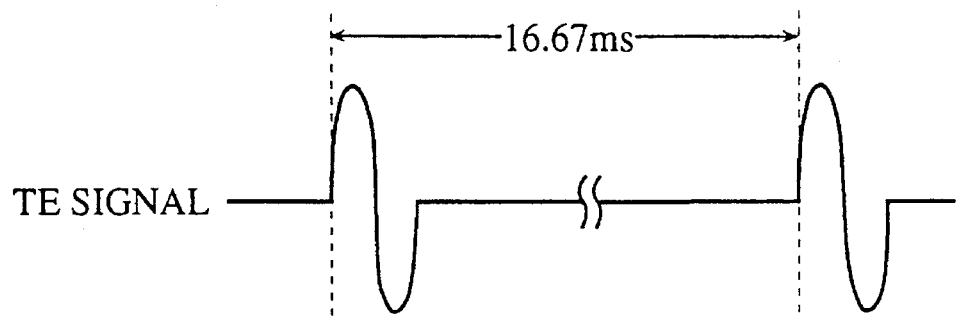
FIG. 9A is a wave diagram showing the TE signal when a still jump is performed.
Figure 9B:
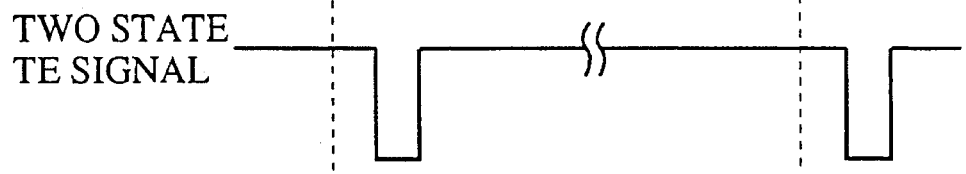
FIG. 9B is a wave diagram showing the two state TE signal when a still jump is performed.
Figure 9C:
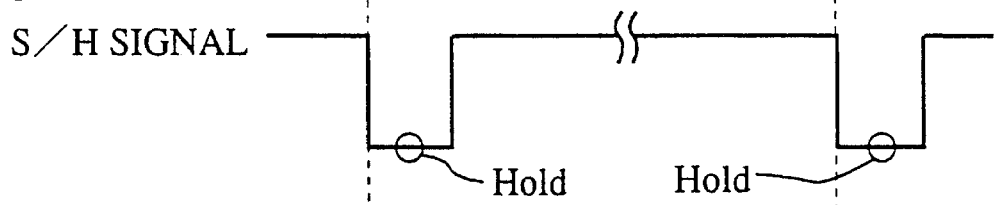
FIG. 9C is a wave diagram showing the S/H signal when a still jump is performed.
Figure 9D:
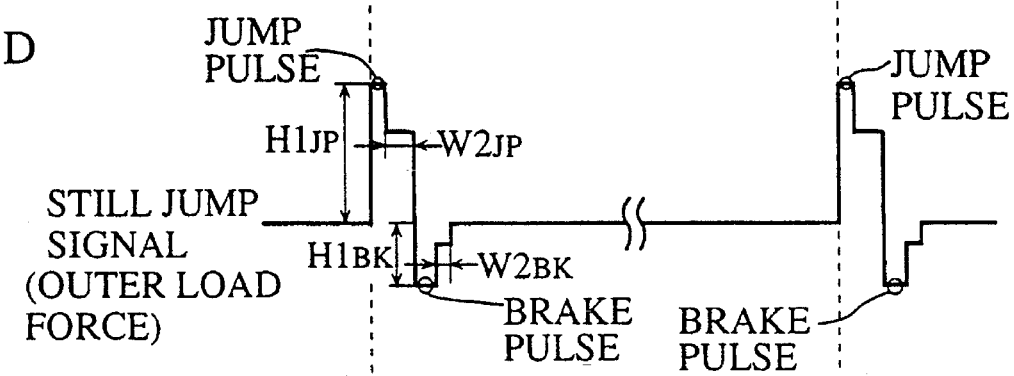
FIG. 9D is a wave diagram showing the still jump signal when a still jump is performed, for when the first and second pulses of each of the jump pulse and the brake pulse, respectively, are controlled in response to an outer load force in the LM 28.
Figure 9E:
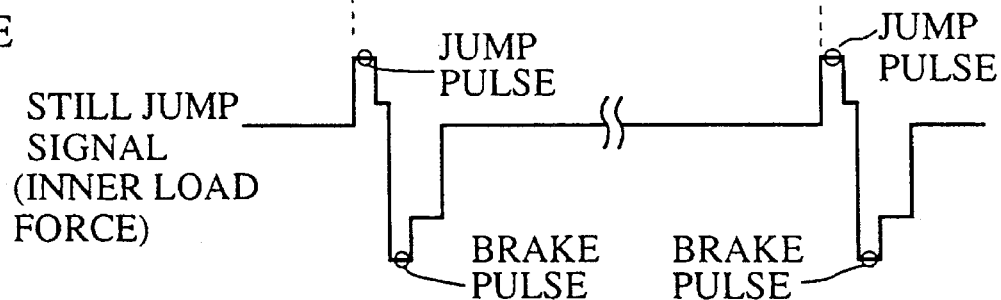
FIG. 9E is a wave diagram showing the still jump signal when a still jump is performed, when the first and second pulses of each of the jump pulse and the brake pulse, respectively, are controlled in response to an inner load force in the LM 28.

FIG. 9A is a wave diagram showing the TE signal when a still jump is performed. FIG. 9B is a wave diagram showing the two state TE signal when a still jump is performed. FIG. 9C is a wave diagram showing the S/H signal when a still jump is performed. FIG. 9D is a wave diagram showing the still jump signal applied to the LM 28 when a still jump is performed, when the first and second pulses of each of the jump pulse and the brake pulse, respectively, are controlled in response to a load in the outward direction of disc 7. FIG. 9E is a wave diagram showing the still jump signal applied to the LM 28 when a still jump is performed, when the first and second pulses of each of the jump pulse and the brake pulse, respectively, are controlled in response to a load in the inward direction of disc 7.

As shown in FIG. 9D, when the load in the flexi-substrate is in an outward direction, then the amplitude of the first jump pulse will be set a value which is relatively large compared to when the load is zero, while the pulse width of the second jump pulse whose amplitude is lower than the aforementioned first jump pulse will be set a value relatively wide compared to when the load is zero. On the other hand, then the amplitude of the first brake pulse will be set a value which is relatively low compared to when the load is zero, while the pulse width of the second brake pulse whose amplitude is yet lower than the aforementioned first brake pulse will be set a value relatively narrow compared to when the load is zero.

Conversely, when the load in the flexi-substrate is in an inward direction, as shown in FIG. 9E, then the amplitude of the first jump pulse will be set a value which is relatively low compared to when the load is zero, while the pulse width of the second jump pulse whose amplitude is yet lower than the aforementioned first jump pulse will be set a value relatively narrow compared to when the load is zero. On the other hand, the amplitude of the first brake pulse will be set a value which is relatively high compared to when the load is zero, while the pulse width of the second brake pulse whose amplitude is lower than the aforementioned first brake pulse will be set a value relatively wide compared to when the load is zero.

Here, the value out of the amplitude and pulse value which is not being controlled is set to equal a constant value which is explained below.

Additionally, the amplitude of the each of the first pulses and the pulse width of each of the second pulses in the still jump signal may be simultaneously controlled in accordance with the driving signal of the LM 28, in the same way as described above in response to the effects due to eccentricities in the track.

When the amplitude of the each of the first pulses and the pulse width of each of the second pulses in the still jump signal are being simultaneously controlled, then by controlling the amplitude of each of the first pulses, then both jump operations for the galvano-mirror 27 and brake operations for the galvano-mirror 27 can be crudely adjusted. Subsequently, by controlling the pulse width of each of the second pulses, then both jump operations for the galvano-mirror 27 and brake operations for the galvano-mirror 27 can be finely adjusted. In doing so, in comparison to still jump signals composed of just one jump pulse and one brake pulse where the amplitude and/or the pulse width of both pulses are/is controlled, a still jump operation of yet greater precision can be executed using the galvano-mirror 27, and a still jump which is even more stabilized can be executed over the entire area of the disc 7.

Additionally, in comparison to still jump operations executed by the galvano-mirror 27 according to still jump signals composed of just one jump pulse and one brake pulse, a still jump operations with smoother movement of the galvano-mirror 27 can be performed.

Here, it is also possible for the first pulse to be set to a standard pulse of constant amplitude and pulse width, with the control of amplitude and/or pulse width being executed for each of the second pulses only.

Also, executing the control of the amplitude and/or the pulse width of the still jump signal composed of a jump pulse and a brake pulse, each of which consisting of a first and a second pulse respectively, may be based on equations 1 and 2 and/or equations 5 and 6, or may be based on equations 3 and 4 and/or equations 7 and 8.

(Track Seeking Operation)

The following is an explanation of the leading-in of the tracking servo after a seeking operation, with reference to the drawings.

Figure 3:
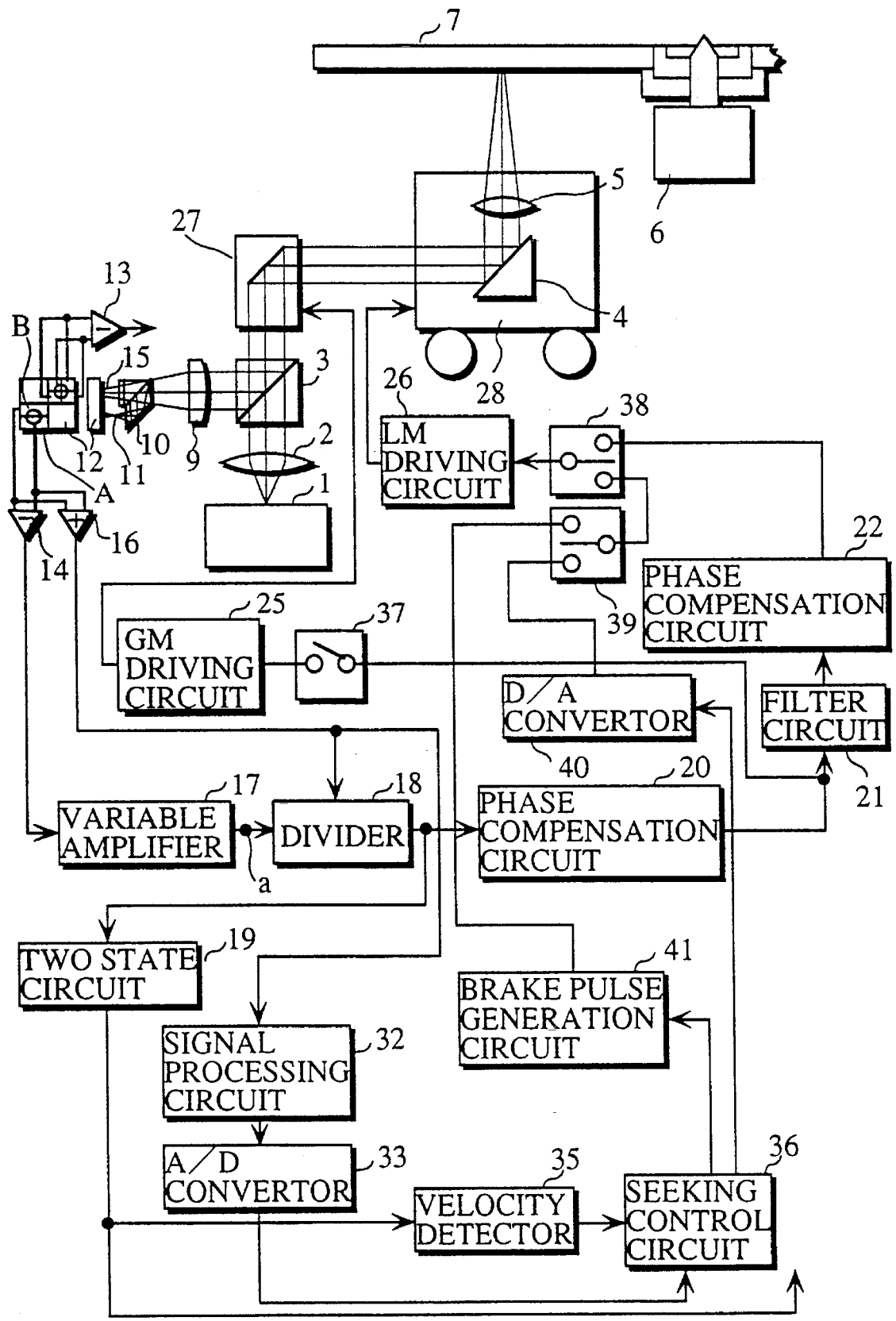
FIG. 3 is a block diagram showing the construction of the part of a tracking control system which relates to a seeking operation under the related art.
Figure 12:
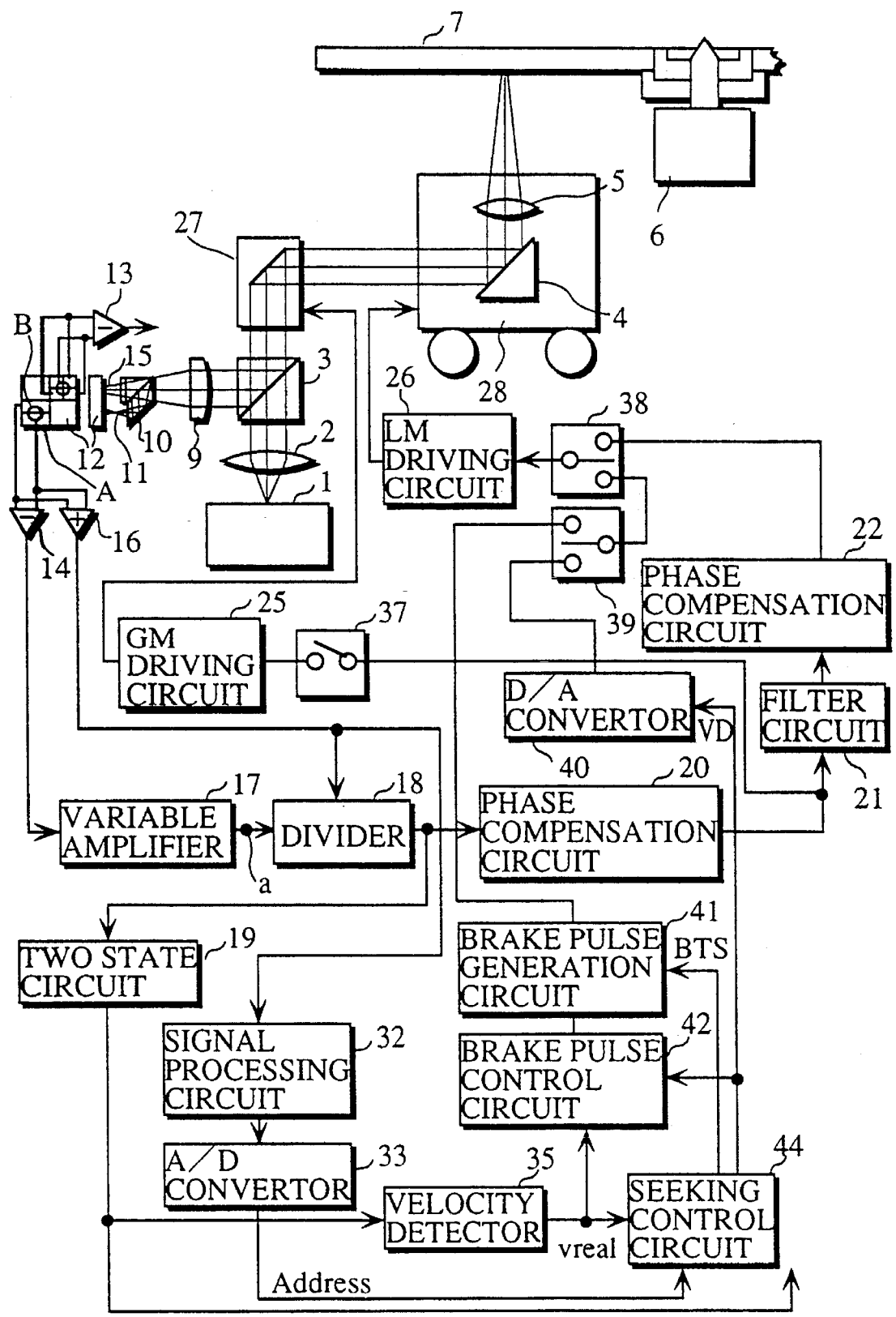
FIG. 12 is a block diagram showing the construction of the part of the tracking control system of the embodiment of the present invention which relates to a seeking operation.

FIG. 12 is a block diagram showing the construction of the part of the tracking control system of the embodiment of the present invention which relates to a seeking operation. Since this drawing features many of the same construction elements which appear in FIG. 3 for the related art, these elements have been given the same reference numerals and their explanation has been omitted.

As shown in FIG. 12, the tracking control system of the present embodiment additionally includes the following new elements; a brake pulse control circuit 42 and a seeking control circuit 44.

The brake pulse control circuit 42 controls the brake pulse generation circuit 41 so as to generate a brake pulse based on the movement velocity of the light spot just before the application of the brake pulse which is detected by the velocity detector 35 and on the LM driving value just before the application of the brake pulse inputted from the seeking control circuit 44.

The seeking control circuit 44 outputs the LM driving value just before the application of the brake pulse to the brake pulse control circuit 42 as a new operation, as well as controlling the seeking operation for the tracking control system in the same way as the seeking control circuit 36 under the related art.

(Track Seeking with Amplitude Control)

Figure 13A:
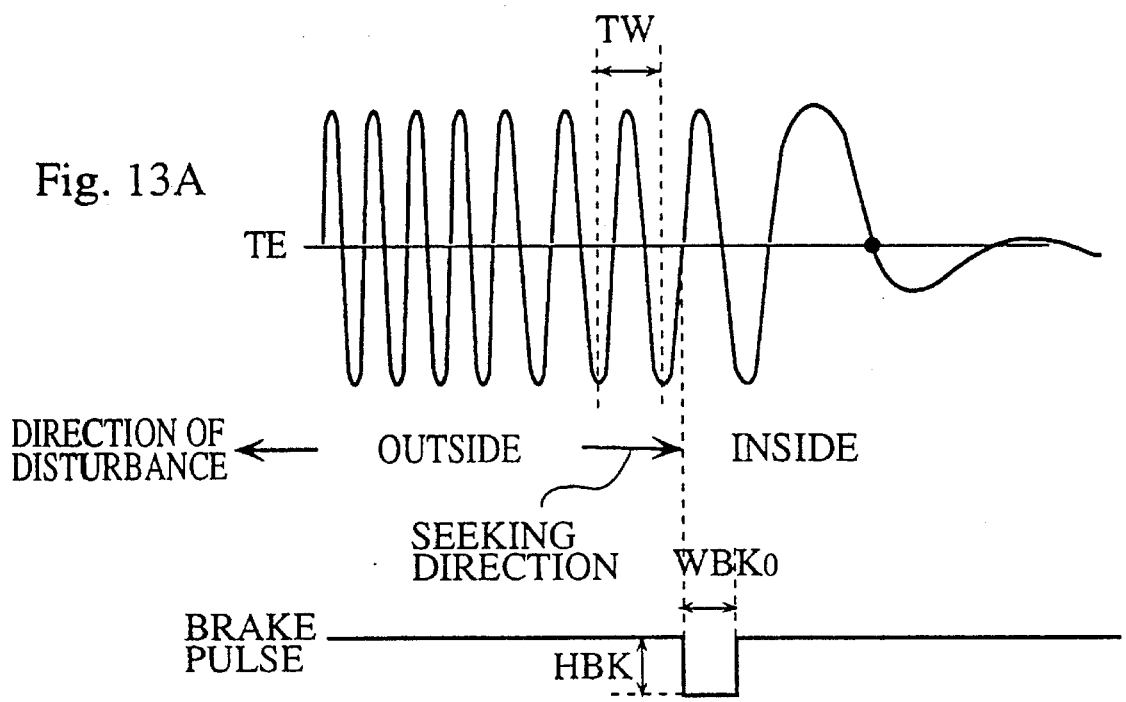
FIG. 13A is a wave diagram for the TE signal and the brake pulse when the amplitude of the brake pulse is being controlled in response to disturbance in the outward direction.
Figure 13B:
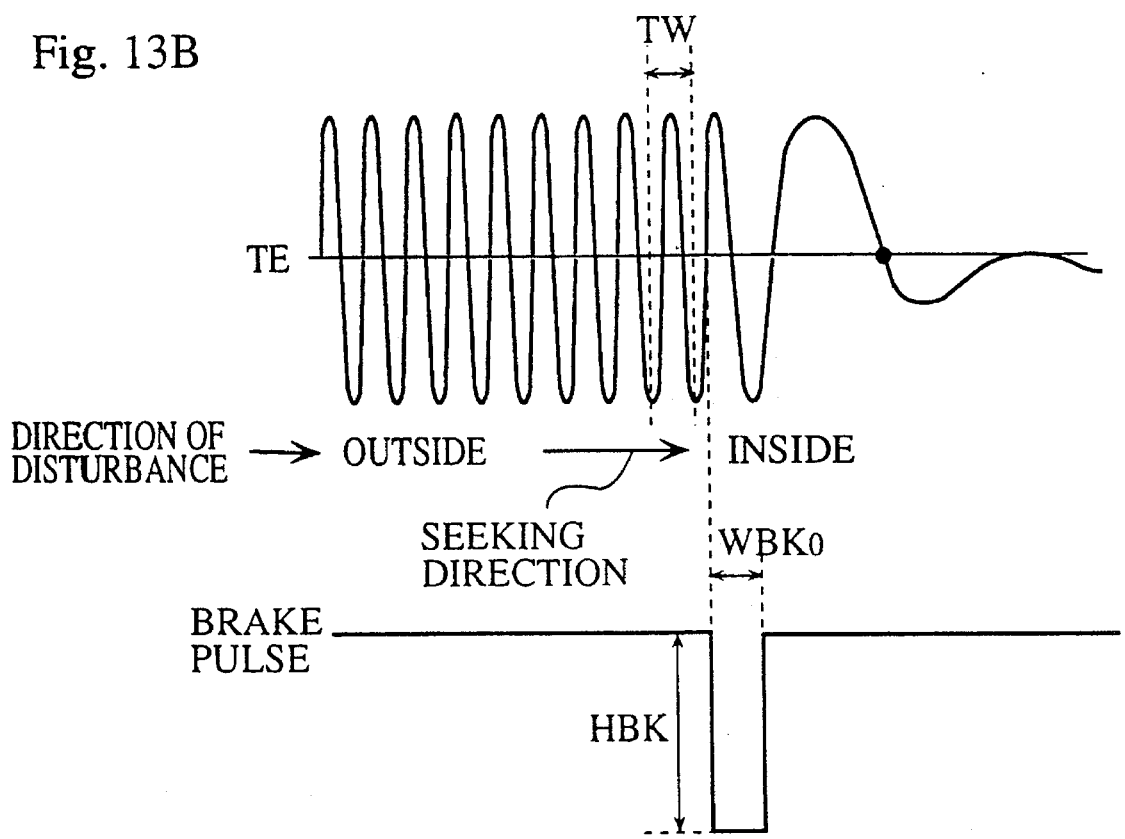
FIG. 13B is a wave diagram for the TE signal and the brake pulse when the amplitude of the brake pulse is being controlled in response to disturbance in the inward direction.
Figure 14:
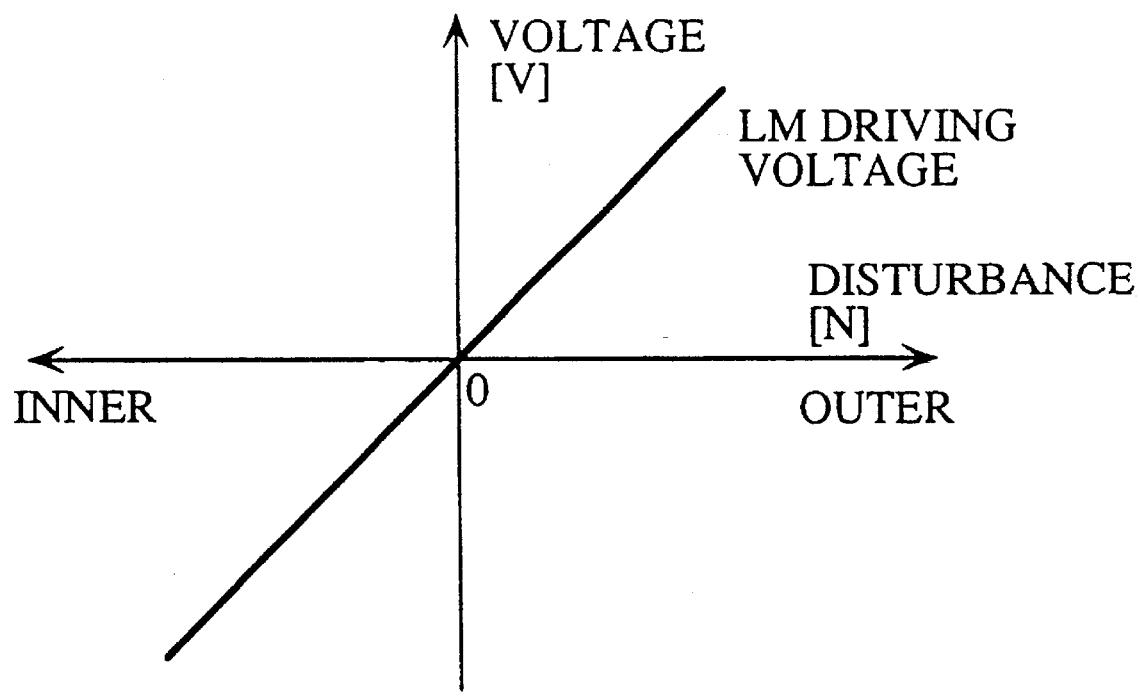
FIG. 14 is a graph showing the relation of the size and the polarity of the LM driving signal to the size and the direction of the disturbance due to the load and suchlike of the flexi-substrate.

The following is an explanation of the control of the amplitude of the brake pulse by the brake pulse control circuit 42, with reference to the drawings, FIG. 12 through FIG. 14. FIG. 13A is a wave diagram for the TE signal and the brake pulse when the amplitude of the brake pulse is being controlled in response to a disturbance in the outward direction, while FIG. 13B is a wave diagram for the TE signal and the brake pulse when the amplitude of the brake pulse is being controlled in response to a disturbance in the inward direction.

In FIG. 13A, although not shown in the drawing, in spite of the velocity control which is being executed so that the movement velocity vreal of the light spot becomes the intended velocity v0, the movement velocity vreal of the light spot actually becomes lower than the intended velocity v0 due to the effects of the disturbance in the outer direction. Also, the LM driving value VSD, in order to execute velocity control in response to the effects of the disturbance in the outer direction, becomes larger than the fundamental LM driving value VSD0 for when there is no disturbance. As a result, when the disturbance due to the load and suchlike in the flexi-substrate is in the outward direction, then, as shown in FIG. 13A, the amplitude of the brake pulse HBK, based on the movement velocity vreal of the light spot just before the brake pulse is applied and on the LM driving value VSD at that point, will be controlled so as to become lower than the fundamental amplitude HBK0 of the brake pulse when there is no disturbance, so that in this way a stabilized servo leading-in operation can be executed.

In FIG. 13B, although not shown in the drawing, in spite of the velocity control which is being executed so that the movement velocity vreal of the light spot becomes the intended velocity v0, the movement velocity vreal of the light spot actually becomes higher than the intended velocity v0 due to the effects of the disturbance in the inner direction. Also, due to the execution of velocity control in a state whereby the LM 28 is moved in the seeking direction even without the application of the LM driving value due to the effects of the disturbance in the inward direction, the LM driving value VSD becomes lower than the fundamental LM driving value VSD0 for when there is no disturbance. As a result, when the disturbance due to the load and suchlike in the flexi-substrate is in the inward direction, then, as shown in FIG. 13B, the amplitude of the brake pulse HBK, based on the movement velocity vreal of the light spot just before the brake pulse is applied and on the LM driving value VSD at that point, will be controlled so as to become higher than the fundamental amplitude HBK0 of the brake pulse when there is no disturbance, so that in this way a stabilized servo leading-in operation can be executed.

Since the timing of the application of the brake pulse and the timing of the leading-in of the tracking servo are the same as for tracking control system under the related art, no further explanation has been made.

FIG. 14 is a graph showing the relation of the size and the polarity of the value in the LM driving signal to the size and the direction of the disturbance due to the load and suchlike of the flexi-substrate. As shown in FIG. 14, in response to disturbances in the outward direction, then the LM driving value for driving the LM 28 at a fixed velocity is positive, with its size directly proportional to the size of the disturbance. Conversely, in response to disturbances in the inward direction, then the LM driving value for driving the LM 28 at a fixed velocity is negative, with its size again directly proportional to the size of the disturbance.

Therefore, when executing seeking in the inward direction of the disc 7, when the effect of the disturbance in the inward direction due to the load and suchlike in the flexi-substrate affects the LM 28 as it becomes close to the intended track, then the LM driving value which executes velocity control, becomes lower than the value for when there is no disturbance due to a load in the flexi-substrate. In the same way, when executing seeking in the inward direction of the disc 7, when the effect of the disturbance in the outward direction due to the load and suchlike in the flexi-substrate affects the LM 28 as it becomes close to the intended track, then the LM driving value which executes velocity control, becomes higher than the value for when there is no disturbance due to a load in the flexi-substrate.

Equation 9 expresses the relationship of the movement velocity vreal of the light spot just before the application of the brake pulse detected by the velocity detector 35 and the LM driving value at that point to the amplitude of the brake pulse on such an occasion. Equations 10 and 11 show the conditions by which the constant of proportionality KD and the constant HC, respectively, are set.

Here, the LM driving value just before the brake pulse is applied is set as VSD, the fundamental value of the LM driving signal just before the brake pulse is applied as VSD0, the change in the aforementioned LM driving value VSD as $\Delta$VSD, the movement velocity of the light spot detected by the velocity detector 35 just before the brake pulse is applied as vreal, the intended velocity just before the brake pulse is applied as v0, the change in the aforementioned movement velocity vreal of the light spot from the aforementioned intended movement velocity v0 as $\Delta$vreal, the amplitude of the brake pulse as HBK, the fundamental value of the amplitude of the brake pulse as HBK0, the change in the amplitude of the brake pulse from the fundamental value of the amplitude as $\Delta$HBK, the constants of proportionality as KSD, KBK, and the constant as HC.

$$\begin{aligned} HBK &= KBK(vreal - KSD \cdot VSD - HC) & \text{(equation 9)} \\ &= KBK\{(v0 + \Delta vreal) - KSD(VSD0 + \Delta VSD) - HC\} \\ &= HBK0 + \Delta HBK \end{aligned}$$

$$(v0+\Delta vreal)-KSD(VSD0+VSD)>0 \quad \text{(equation 10)}$$

$$(v0+\Delta vreal)-KSD(VSD0+\Delta VSD)-HC>0 \quad \text{(equation 11)}$$

In equation 9, the value of the constant of proportionality KSD is adjusted in order to change the ratio of the LM driving value VSD to the value of the movement velocity of the light spot vreal. That is to say, if the value of the constant of proportionality KSD is too high, then since there will be occasions when the amplitude of the brake pulse HBK becomes zero, the constant of proportionality KSD is set a value low enough to ensure that the amplitude of the brake pulse HBK does not become zero, though not so low that the second expression in equation 9 KSD·VSD has no effect on the amplitude of the brake pulse HBK.

Additionally, the constant HC is adjusted in order to control the effect of the value of the movement velocity vreal of the light spot on the value of the amplitude HBK. The value of the constant HC is adjusted so that the amplitude HBK becomes that which is most suitable for the value of the movement velocity of the light spot vreal.

Finally, the adjustment of the constant of proportionality KBK is executed so as to adjust the strength of the brake pulse decided by the value of the amplitude of the brake pulse HBK. By adjusting the constant of proportionality KBK so that the range of values of the amplitude HBK becomes that which is most suitable for the area of values given by the expression (vreal–KSD·VSD–HC), the most appropriate range of values for the amplitude of the brake pulse HBK can be obtained.

In this way, the amplitude HBK of the brake pulse applied to the LM 28 by the brake pulse generation circuit 41 is controlled by the brake pulse control circuit 42 in accordance with the movement velocity vreal of the light spot just before the brake pulse is applied and with the value in the LM driving value at that point, so that stabilized tracking servo leading-in operations can be executed across the entire area of the disc 7.

(Track Seeking with Pulse Width Control)

The following is an explanation of the control of the pulse width of the brake pulse in accordance with the movement velocity vreal of the light spot just before the brake pulse is applied and with the value in the LM driving signal at that point.

Figure 15A:
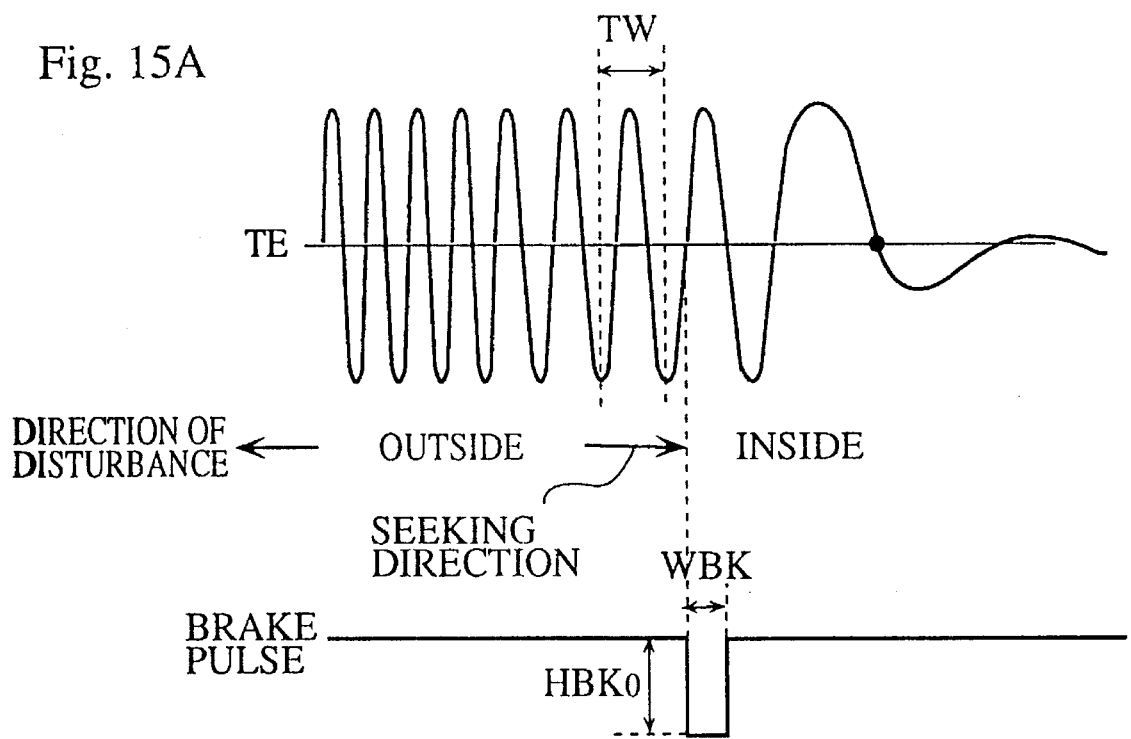
FIG. 15A is a wave diagram for the TE signal and the brake pulse when the pulse width of the brake pulse is being controlled in response to disturbance in the outward direction.
Figure 15B:
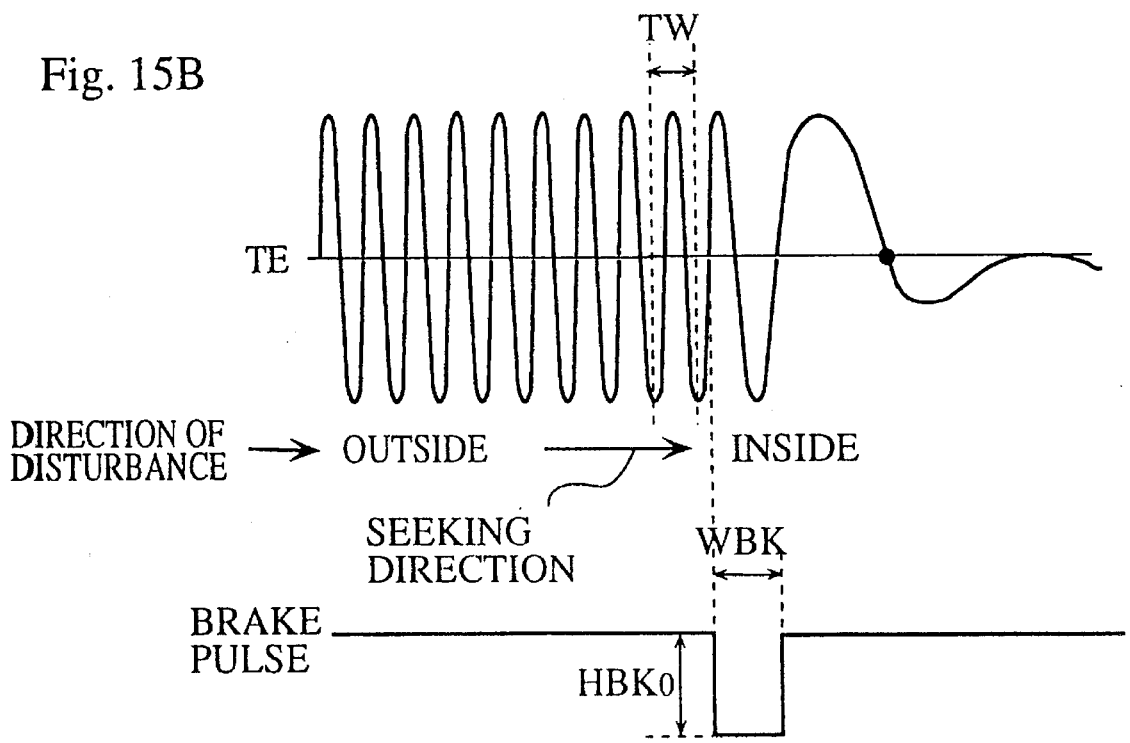
FIG. 15B is a wave diagram for the TE signal and the brake pulse when the pulse width of the brake pulse is being controlled in response to disturbance in the inward direction.

FIG. 15A is a wave diagram for the TE signal and the brake pulse when the pulse width of the brake pulse is being controlled in response to disturbance in the outward direction, while FIG. 15B is a wave diagram for the TE signal and the brake pulse when the pulse width of the brake pulse is being controlled in response to disturbance in the inward direction. Since the seeking operational state of the LM 28 is the same in FIGS. 15A and 15B as that which was shown in FIGS. 13A and 13B, then no further explanation is made.

As shown in FIG. 15A, when the disturbance due to the load and suchlike in the flexi-substrate is in the outward direction of the disc 7, then the pulse width of the brake pulse WBK, based on the movement velocity vreal of the light spot just before the brake pulse is applied and on the LM driving value at that point, will be controlled so as to become narrower than the fundamental pulse width WBK0 of the brake pulse when there is no disturbance, so that in this way a stabilized servo leading-in operation can be executed. As shown in FIG. 15B, when the disturbance due to the load and suchlike in the flexi-substrate is in the inward direction, then the pulse width of the brake pulse WBK, based on the movement velocity vreal of the light spot just before the brake pulse is applied and on the LM driving value at that point, will be controlled so as to become wider than the fundamental pulse width WBK0 of the brake pulse when there is no disturbance, so that in this way a stabilized servo leading-in operation can be executed.

Equation 12 expresses the relationship of the movement velocity vreal of the light spot just before the application of the brake pulse and the LM driving value at that point to the pulse width of the brake pulse on such an occasion. Equations 13 and 14 show the conditions by which the constant of proportionality KSD and the constant WC, respectively, are set.

Here, the pulse width of the brake pulse is set as WBK, the fundamental pulse width of the brake pulse as WBK0, the change in the pulse width of the brake pulse from the fundamental value of the amplitude as $\Delta$WBK, the constants of proportionality as TSD, TBK, and the constant as WC. VSD, VSD0, $\Delta$VSD, vreal, v0, and $\Delta$vreal are all the same as in equation 9, so their explanation has been omitted.

$$\begin{aligned} WBK &= TBK(vreal - TSD \cdot VSD - WC) & \text{(equation 12)}\\ &= TBK\{(v0 + \Delta vreal) - TSD(VSD0 + \Delta VSD) - WC\}\\ &= WBK0 + \Delta WBK \end{aligned}$$

$$(v0+\Delta vreal)-TSD(VSD0+\Delta VSD)>0 \qquad \text{(equation 13)}$$

$$(v0+\Delta vreal)-TSD(VSD0+\Delta VSD)-WC>0 \qquad \text{(equation 14)}$$

In equation 12, the value of the constant of proportionality TSD is adjusted in order to change the ratio of the LM driving value VSD to the value of the movement velocity of the light spot vreal. That is to say, if the value of the constant of proportionality TSD is too high, then since there will be occasions when the pulse width of the brake pulse WBK becomes zero, the constant of proportionality TSD is set a value low enough to ensure that the pulse width of the brake pulse WBK does not become zero, though not so low that the second expression in equation 12 TSD·VSD has no effect on the pulse width of the brake pulse WBK. Additionally, the constant WC is adjusted in order to control the effect of the value of the movement velocity vreal of the light spot on the value of the pulse width WBK. The value of the constant WC is adjusted so that the pulse width WBK becomes that which is most suitable for the value of the movement velocity of the light spot vreal. Finally, the adjustment of the constant of proportionality TBK is executed so as to adjust the strength of the brake pulse decided by the value of the pulse width of the brake pulse WBK. By adjusting the constant of proportionality TBK so that the range of values of the pulse width WBK becomes that which is most suitable for the area of values given by the expression (vreal–TSD·VSD–WC), the most appropriate range of values for the pulse width of the brake pulse WBK can be obtained.

In this way, the pulse width WBK of the brake pulse applied to the LM 28 by the brake pulse generation circuit 41 can be controlled by the brake pulse control circuit 42 in accordance with the movement velocity vreal of the light spot just before the light spot is applied and with the value in the LM driving signal at that point, so that stabilized tracking servo leading-in operations can be executed across the entire area of the disc 7.

(Track Seeking with Simultaneous Amplitude and Pulse Width Control)

The following is an explanation of the control of the amplitude and the pulse width of the brake pulse by the brake pulse control circuit 42 in accordance with the movement velocity of the light spot and with the value in the LM driving signal.

Since control of the amplitude and control of the brake pulse have both been explained already, then an explanation referring to drawings and equations for simultaneous control of the amplitude and the pulse width has been omitted.

The control of brake pulse amplitude can be seen from the drawings, FIG. 12 through FIG. 14, and from the equations 9 through 11. In the same way, control of the pulse width of the brake pulse can be seen from the drawings, FIG. 12, FIG. 14 and FIG. 15, and from the equations 12 through 14.

When the amplitude and the pulse width of the brake pulse applied to the LM 28 are simultaneously controlled, and there is a disturbance in the outward direction due to the load of the flexi-substrate, then when executing a seeking operation from the outside towards the inside of the disc 7, the amplitude of the brake pulse will be set so as to be lower and the pulse width will be set so as to be narrower than that when there is no load in the flexi-substrate. Likewise, if there is a disturbance in the inward direction due to the load and suchlike of the flexi-substrate, then when executing a seeking operation from the outside towards the inside of the disc 7, the amplitude of the brake pulse will be set so as to be greater and the pulse width will be set so as to be wider than that when there is no load in the flexi-substrate.

In comparison to when just one of the amplitude and the pulse width is controlled, simultaneous control of the amplitude and the pulse width of the brake pulse allows for greater freedom in adjusting the influence of the movement velocity of the light spot and of the LM driving value on the size of the brake pulse. That is to say, after setting the constant of proportionality KBK for the amplitude according to the sensitivity of the LM 28 and the dynamic range of the LM driving circuit 26, then the constant of proportionality TBK for the pulse width can be adjusted so as to overcome any insufficiencies in the amplitude control. Therefore, in comparison to when just one of the amplitude and the pulse width is controlled, a brake pulse which responds more accurately to the effects of disturbances can be generated, and tracking servo leading-in operations which are more stabilized can be executed across the entire area of the disc 7.

(Track Seeking with Amplitude Control of the First Brake Pulse and Pulse Width Control of the Second Brake Pulse)

Here, the reduction of velocity for the light spot after a seeking operation is executed by means of a brake pulse consisting of a first pulse and a second pulse. The following is an explanation of when the amplitude of the first brake pulse and the pulse width of the second brake pulse are controlled based on the movement velocity of the light spot just before the application of the brake pulse and the LM driving value at that time, with reference to FIGS. 16A and 16B.

Figure 16A:
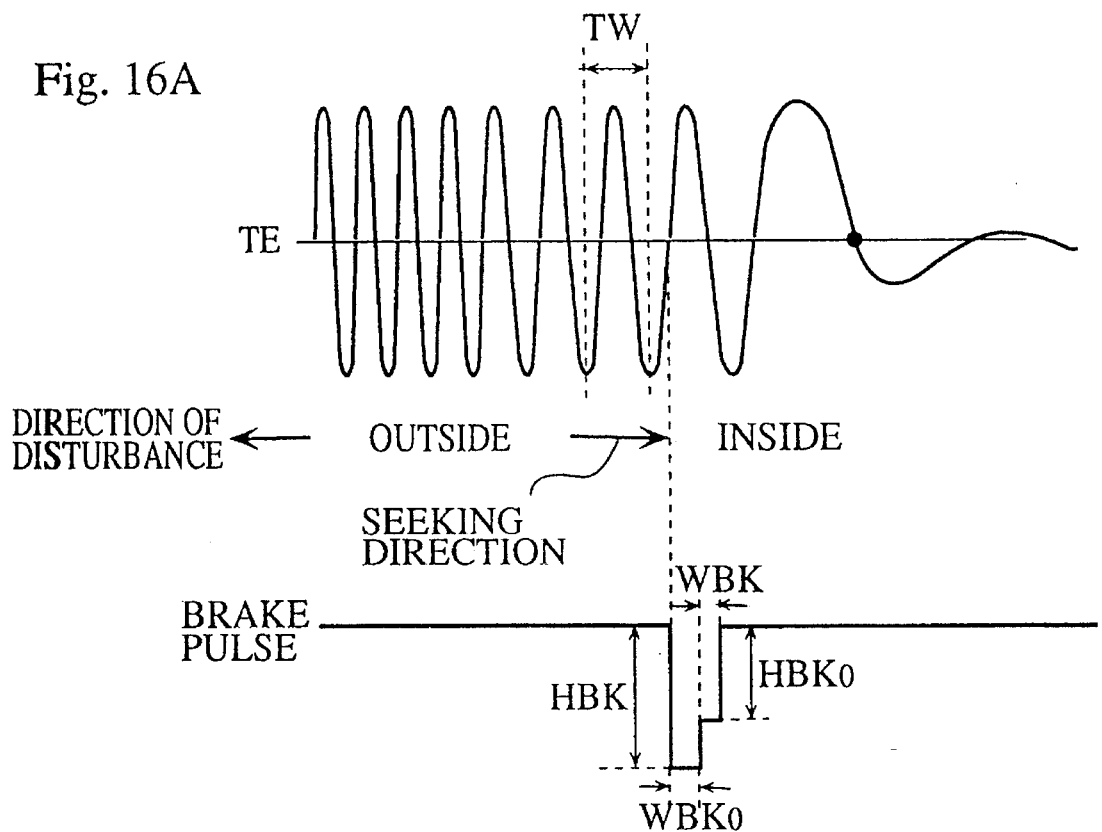
FIG. 16A is a wave diagram for the TE signal and the brake pulse when the amplitude of the first brake pulse and the pulse width of the second brake pulse are being controlled in response to disturbance in the outward direction.
Figure 16B:
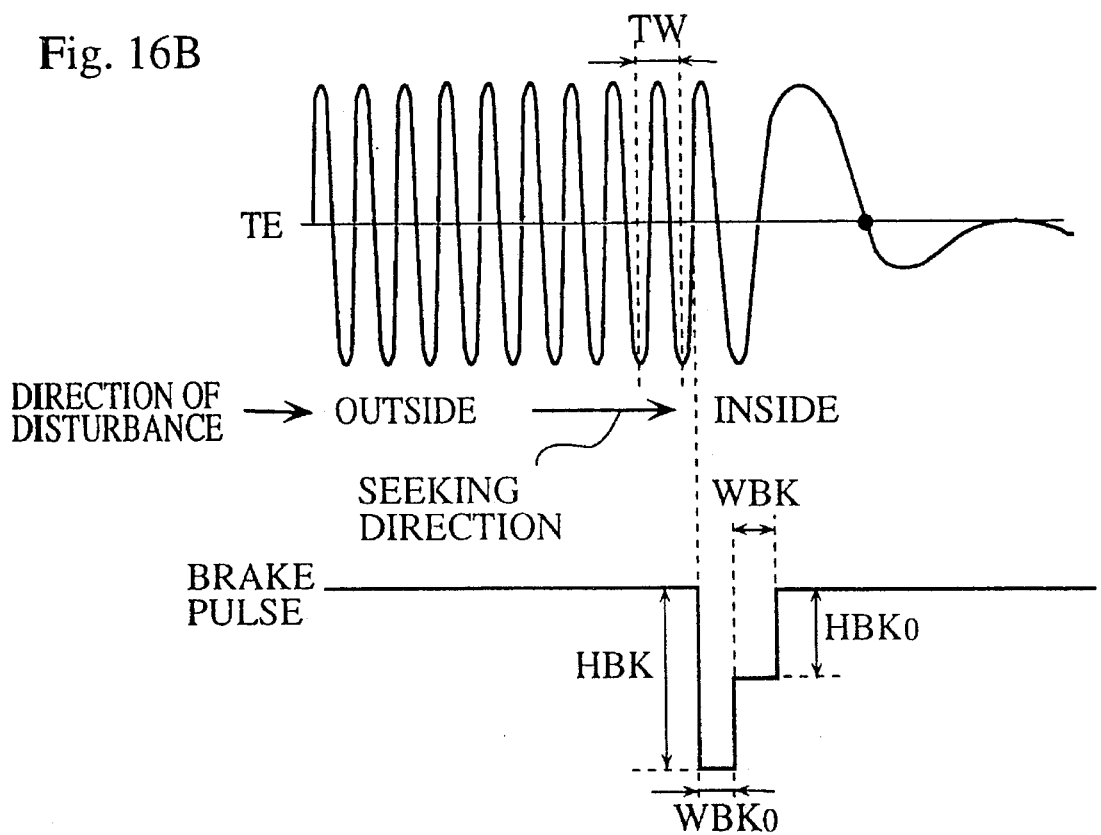
FIG. 16B is a wave diagram for the TE signal and the brake pulse when the amplitude of the first brake pulse and the pulse width of the second brake pulse are being controlled in response to disturbance in the inward direction.

FIG. 16A is a wave diagram for the TE signal and the brake pulse when the amplitude of the first brake pulse and the pulse width of the second brake pulse are being controlled in response to disturbance in the outward direction, while FIG. 16B is a wave diagram for the TE signal and the brake pulse when the amplitude of the first brake pulse and the pulse width of the second brake pulse are being controlled in response to disturbance in the inward direction.

When the amplitude of the first brake pulse and the pulse width of the second brake pulse supplied to the LM 28 are being controlled, and there is a disturbance in the load and suchlike of the flexi-substrate in the outer direction, as shown in FIG. 16A, then the amplitude of the first brake pulse will be adjusted so that it is lower than that when there is no load force, while the second brake pulse, whose amplitude is lower than the first brake pulse, will have its pulse width adjusted so that it is narrower than that when there is no load force. In the same way, when there is a disturbance in the load and suchlike of the flexi-substrate in the inner direction, as shown in FIG. 16B, then the amplitude of the first brake pulse will be adjusted so that it is greater than that when there is no load force, while the second brake pulse, whose amplitude is lower than the first brake pulse, will have its pulse width adjusted so that it is wider than that when there is no load force.

In controlling the amplitude of the first brake pulse and the pulse width of the second brake pulse, then the braking after seeking can be crudely adjusted by means of controlling the amplitude of the first brake pulse and finely adjusted by means of controlling the pulse width of the second brake pulse whose amplitude is lower than that of the first brake pulse. Therefore, in comparison to when just one of the amplitude and the pulse width is controlled, a brake pulse which responds more accurately to the effects of disturbances can be generated, and tracking servo leading-in operations which are more stabilized can be executed across the entire area of the disc 7.

(Track Seeking with Amplitude Control in Response to the LM Driving Value and Pulse Width Control in Response to the Movement Velocity of the Light Spot)

The following is an explanation of when the amplitude of the brake pulse is controlled in response to the LM driving value just before the brake pulse is applied, and the pulse width of the brake pulse is controlled in response to the movement velocity vreal of the light spot just before the brake pulse is applied.

The first part of the explanation is for when the amplitude of the brake pulse is controlled in response to the LM driving value just before the brake pulse is applied.

Equation 15 shows the relationship between the amplitude of the brake pulse and the LM driving value. Equation 16 shows the condition for setting the constant of proportionality KSD and the constant HC. Here VSD, VSD0, $\Delta$VSD, HBK, HBK0, $\Delta$HBK, KSD, and HC are the same as in equation 9, so their explanation has been omitted.

$$HBK = KBK(HC - KSD \cdot VSD) \quad \text{(equation 15)}$$
$$KBK\{HC - KSD(VSD0 + \Delta VSD)\}$$
$$HBK0 + \Delta HBK$$

$$HC - KSD(VSD + \Delta VSD) > 0 \quad \text{(equation 16)}$$

Here, the constant of proportionality KSD is adjusted in order to control the ratio of the LM driving value VSD to the value of the constant HC. If the constant of proportionality KSD is too large, then since there can be occasions when the amplitude of the brake pulse HBK becomes zero, the constant of proportionality KSD is set a value low enough to ensure that the amplitude of the brake pulse HBK does not become zero, though not so low that the second expression in equation 15, TSD·VSD, has no effect on the amplitude of the brake pulse HBK. The value of the constant HC is adjusted so that the amplitude HBK becomes that which is most suitable for the value of the LM driving value. Finally, the adjustment of the constant of proportionality KBK is executed so as to adjust the strength of the brake pulse decided by the value of the amplitude of the brake pulse HBK. By adjusting the constant of proportionality KBK, the most appropriate value of the amplitude of the brake pulse HBK can be obtained.

Equation 17 shows the relationship between the pulse width of the brake pulse and the movement velocity vreal. Here vreal, v0, Δvreal, WBK, WBK0, ΔWBK, TBK, and WC are the same as in equation 9 and equation 12, so their explanation has been omitted. Equation 18 shows the condition for setting the constant WC.

$$WBK=TBK(\text{vreal}-WC)TBK\{(v0+\Delta\text{vreal})-WC\} \quad \text{(equation 17)}$$

$$(v0+\Delta\text{vreal})-WC>0 \quad \text{(equation 18)}$$

Here, the constant WC is adjusted in order to control the pulse width WBK of the brake pulse so as to be that most suitable for the movement velocity vreal of the light spot. Finally, the adjustment of the constant of proportionality TBK is executed so as to adjust the strength of the brake pulse decided by the value of the pulse width WBK of the brake pulse. By adjusting the constant of proportionality TBK so that the range of values of the pulse width WBK becomes that most suitable for the range of values (vreal–WC), the most appropriate value of the pulse width WBK of the brake pulse can be obtained.

Since the relationship between the direction of disturbances to the LM 28 and the controlled amplitude HBK of the brake pulse in response to the direction and the relationship between the direction of disturbances to the LM 28 and the controlled pulse width WBK of the brake pulse in response to the direction have already been explained using FIGS. 13A and 13B and FIGS. 15A and 15B for when amplitude and pulse width are independently controlled, then no further drawings or detailed explanations will be given here.

As was explained above using equations 15 through 18, when the velocity of the LM 28 just before the brake pulse is applied is higher than the intended velocity, then the application time of the brake pulse is lengthened so that the light spot will be slowed so as to fall upon the intended track at a fixed velocity. In the same way, when the velocity of the LM 28 just before the brake pulse is applied is lower than the intended velocity, then the application time of the brake pulse is shortened so that the light spot will be slowed so as to fall upon the intended track at a fixed velocity. Also, when the LM driving value just before the brake pulse is applied is higher than the intended value due the effects of disturbances in the flexi-substrate and suchlike, then the amplitude of the brake pulse is increased so that the light spot will be slowed so as to fall upon the intended track at a fixed velocity. In the same way, when the LM driving value just before the brake pulse is applied is lower than the intended value due the effects of disturbances in the flexi-substrate and suchlike, then the amplitude of the brake pulse is decreased so that the light spot will be slowed so as to fall upon the intended track at a fixed velocity. In this way, by controlling the amplitude of the brake pulse in response to the LM driving value just before the brake pulse is applied and the pulse width of the brake pulse in response to the movement velocity of the light spot just before the brake pulse is applied, tracking servo leading-in operations which are more stabilized can be executed across the entire area of the disc 7.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

What is claimed is:

1. A tracking control system which generates a still jump signal based on a driving value of a wide-area tracking just before a still jump, said tracking control system comprising:

light focusing means for focusing a light beam from a light source on a recording medium;

first tracking means, which has a special preference for high frequency signals, for moving a focused spot of the light beam focused by the light focusing means across tracks on the recording medium;

second tracking means, used for the wide-area tracking, which has a special preference for signals of a lower frequency than the first tracking means, for moving the focused spot across a wider area of the tracks on the recording medium than the first tracking means;

tracking error signal generation means for detecting that the focused spot has deviated from the track based on a reflected light when the light beam is reflected back from the recording medium, and for generating a tracking error signal which shows that the detected focused beam has deviated from the track;

first driving control means for applying a first driving signal to the first tracking means according to the tracking error signal and controlling a driving of the first tracking means so that the focused spot follows the track;

second driving control means for applying a second driving signal to the second tracking means according to a low frequency part of the tracking error signal and controlling a driving of the second tracking means so that the focused spot follows the track;

driving control halting means for temporarily stopping driving control by the second driving control means;

driving value holding means for holding a value of the second driving signal just before the driving control by the second driving control means is temporarily stopped;

still jump signal generation means for generating a still jump signal, which is based on the value of the second driving signal held by the driving value holding means and which consists of a jump pulse and a brake pulse, which has the first tracking means perform a still jump; and still jump signal addition means for adding, just after the control of the second driving control means has been temporarily stopped, the still jump signal generated by the still jump signal generation means to the first driving signal.

2. The tracking control system of claim 1, wherein the driving value holding means includes sample/hold means for having the tracking error signal inputted, for outputting the inputted tracking error signal as it is when in a sample mode, and for storing a value of the tracking error signal just before a hold mode becomes operational and then outputting the tracking error signal, when in a hold mode, and the second driving control means includes:

second driving signal generation means for generating the second driving signal in accordance with a value in the tracking error signal inputted via the sample/hold means; and second driving means for driving the second tracking means by applying the second driving signal generated by the second driving signal generation means to the second tracking means, and the still jump signal generation means includes;

sample/hold control means for controlling the sample/hold means so that it is set onto a hold mode when the control of the second driving control means is temporarily stopped and is set onto the sample mode when the second driving control means is not stopped;

jump pulse generation means for generating the jump pulse; and brake pulse generation means for generating the brake pulse.

3. The tracking control system of claim 2, wherein the jump pulse generation means additionally includes jump pulse calculation means for calculating at least one of an amplitude and a pulse width of the jump pulse based on the value stored by the sample/hold means, wherein the jump pulse generation means generates the jump pulse using a calculated result of the jump pulse calculation means.

4. The tracking control system of claim 3, wherein the jump pulse calculation means further includes:

jump pulse amplitude calculation means for calculating the amplitude of the jump pulse, set as HJP, according to an equation below, $$HJP = KJP1 \cdot HJPC + KJP2 \cdot VD$$

where VD is the value stored in the sample/hold means, HJPC is a constant and KJP1 and KJP2 are constants of proportionality, including a case when KJP1 and KJP2 are equal; and jump pulse width calculation means for calculating the pulse width of the jump pulse, set as WJP, according to an equation below, $$WJP = TJP1 \cdot WJPC + TJP2 \cdot VD$$

where VD is the value stored in the sample/hold means, WJPC is a constant and TJP1 and TJP2 are constants of proportionality, including a case when TJP1 and TJP2 are equal.

5. The tracking control system of claim 4, wherein the brake pulse generation means includes brake pulse calculation means for calculating at least one of an amplitude and a pulse width of the brake pulse based on the value stored by the sample/hold means, wherein the brake pulse generation means generates the brake pulse using a calculated result of the brake pulse calculation means.

6. The tracking control system of claim 5, wherein the brake pulse calculation means further includes:

brake pulse amplitude calculation means for calculating the amplitude of the brake pulse, set as HBRK, according to an equation below, $$HBRK = KBRK1 \cdot HBRKC - KBRK2 \cdot VD$$

where VD is the value stored in the sample/hold means, HBRKC is a constant and KBRK1 and KBRK2 are constants of proportionality, including a case when KBRK1 and KBRK2 are equal; and brake pulse width calculation means for calculating the pulse width of the brake pulse, set as WBRK, according to an equation below, $$WBRK = TBRK1 \cdot WBRKC - TBRK2 \cdot VD$$

where VD is the value stored in the sample/hold means, WBRKC is a constant and TBRK1 and TBRK2 are constants of proportionality, including a case when TBRK1 and TBRK2 are equal.

7. The tracking control system of claim 4, wherein the brake pulse generation means includes:

first brake pulse amplitude calculation means for calculating an amplitude of a first brake pulse, based on the value stored by the sample/hold means; and second brake pulse width calculation means for calculating a pulse width of a second brake pulse, based on the value stored by the sample/hold means, wherein the brake pulse generation means generates a brake pulse consisting of the first brake pulse whose amplitude is calculated by the first brake pulse amplitude calculation means and the second brake pulse whose pulse width is calculated by the second brake pulse width calculation means.

8. The tracking control system of claim 7, wherein the first brake pulse amplitude calculation means calculates the amplitude of the first brake pulse, set as H1BRK, using an equation given below, $$H1BRK = KBRK3 \cdot H1BRKC - KBRK4 \cdot VD$$

where VD is the value stored in the sample/hold means, H1BRKC is a constant and KBRK3 and KBRK4 are constants of proportionality, including a case when KBRK3 and KBRK4 are equal; and the second brake pulse width calculation means calculates the pulse width of the second brake pulse, set as W2BRK, according to an equation given below, $$W2BRK = TBRK3 \cdot W2BRKC - TBRK4 \cdot VD$$

where VD is the value stored in the sample/hold means, W2BRKC is a constant and TBRK3 and TBRK4 are constants of proportionality, including a case when TBRK3 and TBRK4 are equal.

9. The tracking control system of claim 2, wherein the jump pulse generation means includes:

first jump pulse amplitude calculation means for calculating an amplitude of a first jump pulse, based on the value stored by the sample/hold means;

second jump pulse width calculation means for calculating a pulse width of a second jump pulse, based on the value stored by the sample/hold means, wherein the jump pulse generation means generates a jump pulse consisting of the first jump pulse whose amplitude is calculated by the first jump pulse amplitude calculation means and the second jump pulse whose pulse width is calculated by the second jump pulse width calculation means.

10. The tracking control system of claim 9, wherein the first jump pulse amplitude calculation means calculates the amplitude of the first jump pulse, set as H1JP, using an equation given below, $$H1JP = KJP3 \cdot H1JPC - KJP4 \cdot VD$$

where VD is the value stored in the sample/hold means, H1JPC is a constant and KJP3 and KJP4 are constants of proportionality, including a case when KJP3 and KJP4 are equal; and the second jump pulse width calculation means calculates the pulse width of the second brake pulse, set as W2JP, according to an equation given below, $$W2JP = TJP3 \cdot W2JPC - TJP4 \cdot VD$$

where VD is the value stored in the sample/hold means, W2JPC is a constant and TJP3 and TJP4 are constants of proportionality, including a case when TJP3 and TJP4 are equal.

11. The tracking control system of claim 10, wherein the brake pulse generation means includes brake pulse calculation means for calculating at least one of an amplitude and a pulse width of the brake pulse based on the value stored by the sample/hold means, wherein the brake pulse generation means generates the brake pulse using a calculated result of the brake pulse calculation means.

12. The tracking control system of claim 11, wherein the brake pulse calculation means further includes:

brake pulse amplitude calculation means for calculating the amplitude of the brake pulse, set as HBRK, according to an equation below, $$HBRK = KBRK1 \cdot HBRKC - KBRK2 \cdot VD$$

where VD is the value stored in the sample/hold means, HBRKC is a constant and KBRK1 and KBRK2 are constants of proportionality, including a case when KBRK1 and KBRK2 are equal; and brake pulse width calculation means for calculating the pulse width of the brake pulse, set as WBRK, according to an equation below, $$WBRK = TBRK1 \cdot WBRKC - TBRK2 \cdot VD$$

where VD is the value stored in the sample/hold means, WBRKC is a constant and TBRK1 and TBRK2 are constants of proportionality, including a case when TBRK1 and TBRK2 are equal.

13. The tracking control system of claim 10, wherein the brake pulse generation means includes:

first brake pulse amplitude calculation means for calculating an amplitude of a first brake pulse, based on the value stored by the sample/hold means; and second brake pulse width calculation means for calculating a pulse width of a second brake pulse, based on the value stored by the sample/hold means, wherein the brake pulse generation means generates a brake pulse consisting of the first brake pulse whose amplitude is calculated by the first brake pulse amplitude calculation means and the second brake pulse whose pulse width is calculated by the second brake pulse width calculation means.

14. The tracking control system of claim 13, wherein the first brake pulse amplitude calculation means calculates the amplitude of the first brake pulse, set as H1BRK, using an equation given below, $$H1BRK = KBRK3 \cdot H1BRKC - KBRK4 \cdot VD$$

where VD is the value stored in the sample/hold means, H1BRKC is a constant and KBRK3 and KBRK4 are constants of proportionality, including a case when KBRK3 and KBRK4 are equal; and the second brake pulse width calculation means calculates the pulse width of the second brake pulse, set as W2BRK, according to an equation given below, $$W2BRK = TBRK3 \cdot W2BRKC - TBRK4 \cdot VD$$

where VD is the value stored in the sample/hold means, W2BRKC is a constant and TBRK3 and TBRK4 are constants of proportionality, including a case when TBRK3 and TBRK4 are equal.

15. The tracking control system of claim 2, wherein the brake pulse generation means includes brake pulse calculation means for calculating at least one of an amplitude and a pulse width of the brake pulse based on the value stored by the sample/hold means, wherein the brake pulse generation means generates the brake pulse using a calculated result of the brake pulse calculation means.

16. The tracking control system of claim 15, wherein the brake pulse calculation means further includes:

brake pulse amplitude calculation means for calculating the amplitude of the brake pulse, set as HBRK, according to an equation below, $$HBRK = KBRK1 \cdot HBRKC - KBRK2 \cdot VD$$

where VD is the value stored in the sample/hold means, HBRKC is a constant and KBRK1 and KBRK2 are constants of proportionality, including a case when KBRK1 and KBRK2 are equal; and brake pulse width calculation means for calculating the pulse width of the brake pulse, set as WBRK, according to an equation below, $$WBRK = TBRK1 \cdot WBRKC - TBRK2 \cdot VD$$

where VD is the value stored in the sample/hold means, WBRKC is a constant and TBRK1 and TBRK2 are constants of proportionality, including a case when TBRK1 and TBRK2 are equal.

17. The tracking control system of claim 2, wherein the brake pulse generation means includes:

first brake pulse amplitude calculation means for calculating an amplitude of a first brake pulse, based on the value stored by the sample/hold means; and second brake pulse width calculation means for calculating a pulse width of a second brake pulse, based on the value stored by the sample/hold means, wherein the brake pulse generation means generates a brake pulse consisting of the first brake pulse whose amplitude is calculated by the first brake pulse amplitude calculation means and the second brake pulse whose pulse width is calculated by the second brake pulse width calculation means.

18. The tracking control system of claim 17, wherein the first brake pulse amplitude calculation means calculates the amplitude of the first brake pulse, set as H1BRK, using an equation given below, $$H1BRK = KBRK3 \cdot H1BRKC - KBRK4 \cdot VD$$

where VD is the value stored in the sample/hold means, H1BRKC is a constant and KBRK3 and KBRK4 are constants of proportionality, including a case when KBRK3 and KBRK4 are equal; and the second brake pulse width calculation means calculates the pulse width of the second brake pulse, set as W2BRK, according to an equation given below, $$W2BRK = TBRK3 \cdot W2BRKC - TBRK4 \cdot VD$$

where VD is the value stored in the sample/hold means, W2BRKC is a constant and TBRK3 and TBRK4 are constants of proportionality, including a case when TBRK3 and TBRK4 are equal.

19. A tracking control system comprising:

light focusing means for focusing a light beam from a light source on a recording medium;

first tracking means, which has a special preference for high frequency signals, for moving a focused spot of the light beam focused by the light focusing means across tracks on the recording medium;

second tracking means, which has a special preference for signals of a lower frequency than the first tracking means, for moving the focused spot across a wider area of the tracks on the recording medium than the first tracking means;

tracking error signal generation means for detecting that the focused spot has deviated from the track based on a reflected light when the light beam is reflected back from the recording medium, and for generating a tracking error signal which shows that the detected focused beam has deviated from the track;

first driving control means for applying a first driving signal to the first tracking means according to the tracking error signal and controlling a driving of the first tracking means so that the focused spot follows the track;

second driving control means for applying a second driving signal to the second tracking means according to a low frequency part of the tracking error signal and controlling a driving of the second tracking means so that the focused spot follows the track;

seeking driving means for temporarily stopping control by the first driving control means and the second driving control means, and for driving the second tracking means so that the focused spot moves from its present position towards an intended seeking track by applying a predetermined seeking driving signal to the second tracking means;

velocity detection means for detecting a velocity of the focused spot crossing the tracks;

address detection means for detecting an address of a track where the focused spot is presently positioned based on the reflected light reflected back off the recording medium;

velocity control means for controlling the seeking driving means so that the velocity of the focused spot crossing the tracks on the recording medium is a velocity predetermined for each position of the focused spot relative to the intended seeking track, based on the detected velocity and the detected address;

brake pulse generation means for generating a brake pulse for driving the second driving means in a direction which is opposite to a driving direction of the seeking driving means, based on the velocity of the focused spot just before it reaches an edge of the area closest to the intended seeking track and the seeking driving signal at a same point; and braking means for temporarily stopping the seeking driving means when the focused spot has reached the edge of the area closest to the intended seeking track and for slowing the second tracking means by applying the generated brake pulse to the second tracking means.

20. The tracking control system of claim 19, wherein the brake pulse generation means includes brake pulse calculation means for calculating at least one of an amplitude and a pulse width of the brake pulse, based on the velocity of the focused spot just before it reaches the edge of the area closest to the intended seeking track and the seeking driving signal at a same point, wherein the brake pulse generation means generates the brake pulse using a calculation result of the brake pulse calculation means.

21. The tracking control system of claim 20, wherein the brake pulse calculation means includes:

brake pulse amplitude calculation means for calculating the amplitude of the brake pulse, set as HBK, using an equation given below, $$HBK = KBK(vreal - KSD \cdot VSD - HC)$$

with vreal−KSD·VSD>0
and vreal−KSD·VSD−HC>0 where vreal is the velocity of the focused spot just before it reaches the edge of the area closest to the intended seeking track, VSD is the seeking driving signal at a same point, KBK and KSD are constants of proportionality and HC is a constant; and brake pulse width calculation means for calculating the pulse width of the brake pulse, set as WBK, according to an equation given below, $$WBK = TBK(vreal - TSD \cdot VSD - WC)$$

with vreal−TSD·VSD>0
and vreal−TSD·VSD−WC>0 where TBK and TSD are constants of proportionality and WC is a constant.

22. The tracking control system of claim 19, wherein the brake pulse generation means includes:

first brake pulse amplitude calculation means for calculating an amplitude of the first brake pulse, based on the velocity of the focused spot just before it reaches the edge of the area closest to the intended seeking track and the seeking driving signal at a same point; and second brake pulse width calculation means for calculating a pulse width of the second brake pulse, based on the velocity of the focused spot just before it reaches the edge of the area closest to the intended seeking track and the seeking driving signal at a same point, wherein the brake pulse generation means generates a brake pulse consisting of the first brake pulse whose amplitude is calculated by the first brake pulse amplitude calculation means and the second brake pulse whose pulse width is calculated by the second brake pulse width calculation means.

23. The tracking control system of claim 22, wherein the first brake pulse amplitude calculation means calculates the amplitude of the first brake pulse, set as H1BK, using an equation given below, $$H1BK = K1BK(vreal - K1SD \cdot VSD - H1C)$$

with vreal−K1SD·VSD>0
and vreal−K1SD·VSD−H1C>0 where vreal is the velocity of the focused spot just before it reaches the edge of the area closest to the intended seeking track, VSD is the seeking driving signal at a same point, K1BK and K1SD are constants of proportionality and H1C is a constant; and the second brake pulse width calculation means calculates the pulse width of the second brake pulse, set as W2BK, according to an equation given below, $$W2BK = T2BK(vreal - T2SD \cdot VSD - W2C)$$

with vreal−T2SD·VSD>0
and vreal−T2SD·VSD−W2C>0 where T2BK and T2SD are constants of proportionality and W2C is a constant.

24. The tracking control system of claim 19, wherein the brake pulse generation means includes:

brake pulse amplitude calculation means for calculating an amplitude of the brake pulse, based on a value of the seeking driving signal just before the focused spot reaches the edge of the area closest to the intended seeking track, brake pulse width calculation means for calculating a pulse width of the brake pulse, based on the velocity of the focused spot just before it reaches the edge of the area closest to the intended seeking track, wherein the brake pulse generation means generates the brake pulse whose amplitude is calculated by the brake pulse amplitude calculation means and whose pulse width is calculated by the brake pulse width calculation means.

25. The tracking control system of claim 24, wherein the brake pulse amplitude calculation means calculates an amplitude of the brake pulse, set as HBK, using an equation given below, $$HBK = KBK(HC - KSD \cdot VSD)$$

with HC−KSD·VSD>0 where VSD is the value of seeking driving signal just before the focused spot reaches the edge of the area closest to the intended seeking track, KBK and KSD are constants of proportionality and HC is a constant; and brake pulse width calculation means calculates the pulse width of the brake pulse, set as WBK, according to an equation given below, $$WBK = TBK(vreal - WC)$$

with vreal−WC>0 where vreal is the velocity of the focused spot just before it reaches the edge of the area closest to the intended seeking track, TBK and TSD are constants of proportionality and WC is a constant.

26. A tracking control system comprising:

light focusing means for focusing a light beam from a light source on a recording medium;

first tracking means, which has a special preference for high frequency signals, for moving a focused spot of the light beam focused by the light focusing means across tracks on the recording medium;

second tracking means, which has a special preference for signals of a lower frequency than the first tracking means, for moving the focused spot across a wider area of the tracks on the recording medium than the first tracking means;

tracking error signal generation means for detecting that the focused spot has deviated from the track based on a reflected light when the light beam is reflected back from the recording medium, and for generating a tracking error signal which shows that the detected focused beam has deviated from the track;

first driving control means for applying a first driving signal to the first tracking means according to the tracking error signal and controlling a driving of the first tracking means so that the focused spot follows the track;

second driving control means for applying a second signal to the second tracking means according to a low frequency part of the tracking error signal and controlling a driving of the second tracking means so that the focused spot follows the track;

still jump signal generation means for temporarily stopping a control of the second driving control means, and for generating a still jump signal based on the second driving signal just before the control of the second driving control means is temporarily stopped, consisting of a jump pulse and a brake pulse, which has the first tracking means perform a still jump;

still jump signal addition means for adding, just after the control of the second driving control means has been temporarily stopped, the still jump signal generated by the still jump signal generation means to the first driving signal;

a velocity detector for detecting a velocity of the focused spot of the light beam moving across the recording medium; and brake pulse control means responsive to the detected velocity, for controlling the amplitude of the brake pulse and causing a plurality of brake pulses of respective different amplitudes to be applied to halt movement of the focused spot.

27. A tracking control system which generates a still jump signal based on a driving value of a wide-area tracking just before a still jump, said tracking control system comprising:

light focusing means for focusing a light beam from a light source on a recording medium;

first tracking means for moving a focused spot of the light beam focused by the light focusing means across tracks on the recording medium;

second tracking means for moving the focused spot across a wider area of the tracks on the recording medium than the first tracking means;

tracking error signal generation means for detecting that the focused spot has deviated from the track based on a reflected light when the light beam is reflected back from the recording medium, and for generating a tracking error signal which shows that the detected focused beam has deviated from the track;

first driving control means for applying a first driving signal to the first tracking means according to the tracking error signal and controlling a driving of the first tracking means so that the focused spot follows the track;

second driving control means for applying a second driving signal to the second tracking means according to a low frequency part of the tracking error signal and controlling a driving of the second tracking means so that the focused spot follows the track;

driving control halting means for temporarily stopping driving control by the second driving control means;

driving value holding means for holding a value of the second driving signal just before the driving control by the second driving control means is suspended;

a low pass filter circuit for filtering the second driving signal;

still jump signal generation means for generating a still jump signal, which is based on the filtered value of the second driving signal held by the driving value holding means and which consists of a variable amplitude jump pulse and a variable amplitude brake pulse, which has the first tracking means perform a still jump; and still jump signal addition means for adding, just after the control of the second driving control means has been temporarily stopped, the still jump signal generated by the still jump signal generation means to the first driving signal.

* * * * *